US012701628B2

(12) United States Patent
Ma et al.

(10) Patent No.: US 12,701,628 B2
(45) Date of Patent: Aug. 4, 2026

(54) METHODS AND DEVICES FOR SIGNAL PROCESSING

(71) Applicant: ZTE Corporation, Shenzhen (CN)

(72) Inventors: Xuan Ma, Shenzhen (CN); Jun Xu, Shenzhen (CN); Mengzhu Chen, Shenzhen (CN); Focai Peng, Shenzhen (CN); Xiaoying Ma, Shenzhen (CN); Qiujin Guo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 486 days.

(21) Appl. No.: 17/816,549

(22) Filed: Aug. 1, 2022

(65) Prior Publication Data

US 2022/0369418 A1       Nov. 17, 2022

Related U.S. Application Data

(63) Continuation of application No. PCT/CN2020/116247, filed on Sep. 18, 2020.

(51) Int. Cl.
*H04W 76/28* (2018.01)
*H04W 24/08* (2009.01)
*H04W 72/23* (2023.01)

(52) U.S. Cl.
CPC ........... *H04W 76/28* (2018.02); *H04W 24/08* (2013.01); *H04W 72/23* (2023.01)

(58) Field of Classification Search
CPC . H04W 76/28; H04W 24/08; H04W 52/0216;

H04W 52/0219; H04W 52/0229; H04W 52/028; H04W 72/1289; H04W 72/23; H04W 72/231; H04W 72/232; Y02D 30/70

See application file for complete search history.

(56) References Cited

U.S. PATENT DOCUMENTS

| | | | |
|---|---|---|---|
| 2020/0045768 A1* | 2/2020 | He ................... | H04W 52/0216 |
| 2020/0229081 A1 | 7/2020 | Ang et al. | |

FOREIGN PATENT DOCUMENTS

| | | |
|---|---|---|
| CN | 106465270 A | 2/2017 |
| CN | 110830225 A | 2/2020 |
| CN | 110913467 A | 3/2020 |
| CN | 111357389 A | 6/2020 |

OTHER PUBLICATIONS

Vivo ("Discussion on 2nd DRX group", 3GPP TSG-RAN WG1 Meeting #100bis, R1-2001693, Apr. 20-30, 2020) (Year: 2020).*
Huawei, HiSilicon ("RAN 1 impact analysis due to the introduction of secondary DRX cycle", 3GPP TSG RAN Meeting #100bis-e, R1-2002578, Apr. 20-30, 2020) (Year: 2020).*
NEC ("TP on DRX adaptation for alignment", 3GPP TSG-RAN WG1 #102-e, R1-2005957, Aug. 17-28, 2020) (Year: 2020).*

(Continued)

*Primary Examiner* — Ji-Hae Yea
(74) *Attorney, Agent, or Firm* — Crowell & Moring LLP

(57) ABSTRACT

A Medium Access Control (MAC) entity of a user equipment (UE) comprises a primary discontinuous reception (DRX) group and a secondary DRX group. A control channel is monitored for receiving downlink control information (DCI) in at least one serving cell in at least one of the primary DRX group or the secondary DRX group.

15 Claims, 3 Drawing Sheets

Configure, to a UE, an MAC entity comprising a primary DRX group and a secondary DRX group — 400

Transmit DCI on a control channel in at least one serving cell in at least one of the primary DRX group and the secondary DRX group — 401

(56) References Cited

OTHER PUBLICATIONS

Extended European Search Report received for EP Application No. 20953710.9 dated Sep. 22, 2023 (8 pages).

Ericsson: "Email Report of [PostAT109bis-e] [054] [TEI16] Secondary DRX", 3GPP DRAFT; R2-2004855, 3rd Generation Partnership Project (3GPP), Mobile Competence Centre; 650, Route Des Lucioles; F-06921 Sophia-Antipolis Cedex; France, vol. RAN WG2, No. eMeeting; Jun. 1, 2020-Jun. 12, 2020, May 22, 2020, XP052357908, Retrieved from the Internet: URL:https://ftp.3gpp.org/tsg_ran/WG2_RL2/T SGR2_110-e/Docs/R2-2004855.zip R2-2004855 Email report of [PostAT109bis-e] [054] [TEI16], zecondary.docx (27 pp.).

Vivo: "Views on NR TEI for Secondary DRX Group", 3GPP Draft; R2-2004640, 3rd Generation Partnership Project (3GPP), Mobile Competence Centre; 650, Route Des Lucioles; F-06921 Sophia-Antipolis Cedex; France, vol. RAN WG2, No. Electronic; Jun. 1 , 2020-Jun. 12, 2020, May 22, 2020 (May 22, 2020), XP051888283, Retrieved from the Internet: URL:https://ftp.3gpp.org/tsg_ran/WG2_ RL2/TSGR2_110-e/Docs/R2-2004640.zip, R2-2004640_Views on TEI for Secondary DRX Group.doc (4 pp.).

Vivo, "Discussion on 2nd DRX group," R1-2001693, Apr. 10, 2020 (3 pp.).

International Search Report and Written Opinion received for Application No. PCT/CN2020/116247 mailed Jun. 9, 2021 (8 pages).

Huawei et al., "RAN1 impact analysis due to the introduction of secondary DRX cycle," R1-2002578, Apr. 11, 2020 (9 pp.).

Vivo, "Discussion on 2nd DRX group," R1-2001693, Apr. 10, 2020 (4 pp.).

Office Action for Thailand Patent Application No. 2201005355 dated Aug. 31, 2024 (with English Translation) (8 pages).

First Office Action for China Patent Application No. 202080101399.6 dated Apr. 17, 2025 (with English translation) (27 pp.).

OPPO, "Multiple DRX Configurations," R2-1905607, 3GPP TSG-RAN WG2 Meeting #106, Reno, Nevada, USA, Retrieved from the Internet: https://www.3gpp.org/ftp/tsg_ran/WG2_RL2/TSGR2_106/ Docs, May 13-17, 2019 (4 pp.).

Office Action issued for China Patent Application No. 202080101399.6 dated Aug. 27, 2025 (only Chinese language) (9 pp.).

* cited by examiner

Monitor a control channel for receiving DCI in at least one serving cell in at least one of primary DRX group or secondary DRX group — 300

METHODS AND DEVICES FOR SIGNAL PROCESSING

PRIORITY

This application claims priority as a Continuation of PCT/CN2020/116247, filed on Sep. 18, 2020, entitled "METHODS AND DEVICES FOR SIGNAL PROCESSING", published as WO 2022/056852 A1, the entirety of which is incorporated herein by reference.

TECHNICAL FIELD

This document is directed generally to wireless communications.

BACKGROUND

In fifth generation (5G) mobile communication systems, some new technologies/functions are applied compared to previous mobile communication systems, including a wake-up or not-wake-up indication/signal (in a 5G communication system carried by downlink control information (DCI) format 2_6) to indicate whether to start or not to start a respective timer, the drx-onDurationTimer for the next long discontinuous reception, DRX cycle, a dormancy indication outside the active time (in 5G carried by DCI format 2_6) to indicate dormancy behavior of one or multiple secondary cells, SCells, when carrier aggregation is used, and dormancy indication within an active time (in 5G carried by DCI format 0_1/1_1) to indicate SCell dormancy behavior and the presence of a secondary discontinuous reception (DRX) group.

SUMMARY

The following definitions are used throughout the present disclosure:

PCell: Primary Cell. The primary cell of the Master Cell Group (MCG), operating on the primary frequency, in which the user equipment, UE, either performs the initial connection establishment procedure or initiates the connection re-establishment procedure.

PSCell: Primary Secondary Cell. The primary secondary cell of the Secondary Cell Group (SCG) Cell. For dual connectivity operation, the PSCell is the cell in which the UE performs random access when performing the reconfiguration with the synchronization procedure.

SCell: Secondary Cell. For a UE configured with carrier aggregation, the secondary cell provides additional radio resources on top of a special cell (see below).

SpCell: Special Cell. For dual connectivity operation the term Special Cell refers to the PCell of the MCG or the PSCell of the SCG, otherwise the term Special Cell refers to the PCell.

Serving Cell: For a UE having radio resource control connected and not being configured with carrier aggregation/dual activity, there is only one serving cell comprising the primary cell. For a UE having radio resource control connected and being configured with carrier aggregation/dual activity the term 'serving cells' is used to denote the set of cells comprising the Special Cell(s) and all secondary cells.

In 5G standard protocol Release 16, a user equipment/terminal, configured with DRX mode operation in the PCell or in the SpCell, can monitor the DCI format 2_6. A wake-up indication bit in DCI format 2_6 can indicate that the UE shall start or not start the drx-onDurationTimer for the next long DRX cycle. A bitmap located immediately after the wake-up indication bit location can indicate the dormancy behavior of the SCell groups by indicating the switching between the dormant Bandwidth Part (BWP) and the non-dormant BWP. And the UE does not monitor PDCCH for detecting DCI format 2_6 during Active Time.

If a UE has activated search space sets to monitor physical downlink control channel (PDCCH) for detection of DCI format 0_1 and DCI format 1_1 and if one or both of DCI format 0_1 and DCI format 1_1 include a SCell dormancy indication field, the UE can change the dormancy behavior of the SCell groups according to the SCell dormancy indication field carried by DCI format 0_1/1_1.

The members of SCell groups outside an active time and within an active time can be different, and the SCell groups outside an active time are configured by the parameter dormancyGroupOutsideActiveTime, the SCell groups within the active time are configured by the parameter dormancyGroupOutsideActiveTime.

Serving Cells of a Medium Access Control, MAC, entity of the UE may be configured by the higher layer signaling, such as RRC parameter, in two DRX groups. When the RRC does not configure a secondary DRX group, there is only one DRX group. When two DRX groups are configured each group of serving cells, which is called a DRX group, is configured by the RRC with its own set of parameters: drx-onDurationTimer, drx-InactivityTimer. When two DRX groups are configured, the two groups share the following parameter values: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL. The parameter drx-LongCycleStartOffset defines the Long DRX cycle and drx-StartOffset which defines the subframe where the Long and Short DRX Cycle starts. The parameter drx-ShortCycle defines the Short DRX cycle. The parameter drx-ShortCycleTimer defines the duration the UE shall follow the Short DRX cycle. Although the aforementioned scenarios are described with a 5G framework, it is understood by the skilled person that the aforementioned is not limited to this but is also present in other communication systems.

Since the secondary DRX group function is not enabled when the wake up signal (WUS) and the dormancy indication function are introduced, incompatibility or unclear operations may occur when the secondary DRX group and WUS and/or the dormancy indication are applied at the same time. To solve this problem, this disclosure provides a proposal for using the secondary DRX group function and the WUS and/or the dormancy indication function at the same time.

In general, this document relates to methods, systems, and devices for receiving downlink control information of multiple DRX groups, and more particularly to methods, systems, and devices for receiving downlink control information of primary DRX group and secondary DRX group.

The present disclosure relates to a method for use in a user equipment, UE, wherein a Medium Access Control, MAC, entity of the UE, comprises a primary discontinuous reception, DRX, group and a secondary DRX group. The method comprises monitoring a control channel for receiving downlink control information, DCI, in at least one serving cell in at least one of the primary DRX group or the secondary DRX group.

Various embodiments may In some embodiments implement the following features:

In some embodiments, the DCI is a first DCI received outside an active time of at least one of the primary DRX group or the secondary DRX group, wherein the first DCI comprises a wake-up indication.P In some embodiments, on physical downlink control channel monitoring occasions prior to a next DRX cycle, the method comprises receiving the first DCI on a first cell of the primary DRX group.

In some embodiments, on physical downlink control channel monitoring occasions prior to a next DRX cycle, the method comprises receiving the first DCI on a second cell of the secondary DRX group.

In some embodiments, on physical downlink control channel monitoring occasions prior to a next DRX cycle, the method comprises receiving the first DCI on the first cell of the primary DRX group and receiving the first DCI on the second cell of the secondary DRX group.

In some embodiments, at least one serving cell in the primary DRX group follows the wake-up indication.

In some embodiments, at least one serving cell in the secondary DRX group follows the wake-up indication.

In some embodiments, at least one serving cell in the primary DRX group and at least one serving cell in the secondary DRX group follow the wake-up indication.

In some embodiments, at least one serving cell in the primary DRX group and at least one serving cell in the secondary DRX group follow the wake-up indication of the first DCI based on at least one of a predefined information, a higher layer signaling or C bits, where C in the first DCI.

In some embodiments, the higher layer signaling comprises at least one of a radio resource control parameter or an MAC control entity In some embodiments, the wake-up indication comprises M bits, where M≥1, indicating starting or not starting a timer associated with a DRX-On duration for the primary DRX group and the secondary DRX group.

In some embodiments, the wake-up indication comprises N=N1+N2 bits, where N≥1, N1 is a number of bit(s) indicating starting or not starting a timer associated with a DRX-On duration for the primary DRX group, and N2 is a number of bit(s) indicating starting or not starting a timer associated with a DRX-On duration for the secondary DRX group In some embodiments, monitoring the control channel for receiving the DCI in the at least one serving cell in at least one of the primary DRX group or the secondary DRX group comprises monitoring the control channel for receiving the first DCI on physical downlink control channel monitoring occasions prior to a next DRX cycle, wherein the first DCI is not detected, wherein one parameter is predefined to indicate starting or not starting a timer associated with a DRX-On duration in the next DRX cycle for the primary DRX group and the secondary DRX group, or two parameters are predefined to indicate starting or not starting timers associated with a DRX-On duration in the next DRX cycle separately for the primary DRX group and the secondary DRX group.

In some embodiments, the DCI is a second DCI comprising a dormancy indication, wherein the second DCI is received outside an active time of at least one of the primary DRX group or the secondary DRX group and the dormancy indication indicates a dormancy behavior of at least one serving cell in at least one of the primary DRX group or the secondary DRX group.

In some embodiments, the method further comprises receiving the second DCI on a first cell of the primary DRX group In some embodiments, the method further comprises receiving the second DCI on a second cell of the secondary DRX group.

In some embodiments, the method further comprises receiving the second DCI on the first cell of the primary DRX group and monitoring the second DCI on the second cell of the secondary DRX group.

In some embodiments, at least one serving cell in the primary DRX group follows the dormancy indication.

In some embodiments, at least one serving cell in the secondary DRX group follows the dormancy indication.

In some embodiments, at least one serving cell in the primary DRX group and at least one serving cell in the secondary DRX group follow the dormancy indication.

In some embodiments, at least one serving cell in the secondary DRX group follows the dormancy indication of the second DCI based on a higher layer signaling or based on N bits, where N≥1, in the second DCI.

In some embodiments, the higher layer signaling comprises at least one of a radio resource control parameter or an MAC control entity.

In some embodiments, the monitoring the control channel for receiving the DCI in the at least one serving cell in at least one of the primary DRX group or the secondary DRX group comprises monitoring the control channel for the second DCI based on a DRX status of the primary DRX group.

In some embodiments, the monitoring the control channel for receiving the DCI in the at least one serving cell in at least one of the primary DRX group or the secondary DRX group comprises monitoring the control channel for the second DCI based on a DRX status of the secondary DRX group In some embodiments, the monitoring the control channel for receiving the DCI in the at least one serving cell in at least one of the primary DRX group or the secondary DRX group comprises monitoring the control channel for the second DCI based on the DRX statuses of the primary DRX group and secondary DRX group.

In some embodiments, the DCI is a third DCI comprising a dormancy indication, wherein the third DCI is received within an active time of at least one of the primary DRX group or the secondary DRX group and the dormancy indication indicates a dormancy behavior of at least one serving cell in at least one of the primary DRX group or the secondary DRX group.

In some embodiments, the method further comprises receiving the third DCI on a first cell of the primary DRX group In some embodiments, the method further comprises receiving the third DCI on a second cell of the secondary DRX group.

In some embodiments, the method further comprises receiving the third DCI on the first cell of the primary DRX group and monitoring the second DCI on the second cell of the secondary DRX group.

In some embodiments, the monitoring the control channel for receiving the DCI in the at least one serving cell in at least one of the primary DRX group or the secondary DRX group comprises:

monitoring the control channel for receiving the third DCI within the active time of the primary DRX group, wherein the primary DRX group are within the active time, or both the primary DRX group and the secondary DRX group are within the active time.

In some embodiments, at least one serving cell in the primary DRX group and at least one serving cell in the secondary DRX group follow the dormancy indication of the third DCI.

In some embodiments, at least one serving cell in one of the primary DRX group and the secondary DRX group follow the dormancy indication of the third DCI.

In some embodiments, the third DCI comprises N bits, where N≥1, indicating whether the dormancy indication is enabled for at least one serving cell in the primary DRX group and at least one serving cell in the secondary DRX group.

In some embodiments, the dormancy indication received in one of the primary DRX group and the secondary DRX group indicates the dormancy behavior of at least one serving cell in the DRX group in which the dormancy indication is received.

In some embodiments, the dormancy indication received in one of the primary DRX group and the secondary DRX group indicates the dormancy behavior of at least one serving cell in the primary DRX group and at least one serving cell in the secondary DRX group.

In some embodiments, the third DCI is received on the second cell of the secondary DRX group, wherein at least one secondary cell follows the dormancy indication when the third DCI comprises scheduling information, or the at least one secondary cell follows the dormancy indication when the third DCI does not comprise the scheduling information, or the at least one secondary cell follows the dormancy indication regardless of whether the third DCI comprises the scheduling information.

In some embodiments, the DCI is a fourth DCI received outside an active time of at least one of the primary DRX group or the secondary DRX group and the fourth DCI comprises a wake-up indication and a dormancy indication.

In some embodiments, the method further comprises receiving the fourth DCI on a first cell of the primary DRX group In some embodiments, the method further comprises receiving the fourth DCI on a second cell of the secondary DRX group.

In some embodiments, the method further comprises receiving the fourth DCI on the first cell of the primary DRX group and receiving the fourth DCI on the second cell of the secondary DRX group.

In some embodiments, the fourth DCI indicates starting or not starting a timer associated with a DRX-On duration and dormancy behavior related operations in one of the primary DRX group and the secondary DRX group.

In some embodiments, the fourth DCI indicates the UE to start or not a timer associated with a DRX-On duration and dormancy behavior related operations in the primary DRX group and the secondary DRX group.

In some embodiments, the monitoring the control channel for receiving the fourth DCI in the at least one serving cell in at least one of the primary DRX group or the secondary DRX group comprises:

monitoring the control channel for receiving the fourth DCI on a first cell of the primary DRX group based on a DRX status of the primary DRX group.

In some embodiments, the method further comprises not monitoring the control channel for receiving the fourth DCI prior to the next long DRX cycle within the active time of one of the primary DRX group and secondary DRX group, and In some embodiments starting a timer associated with a DRX-On duration in the next DRX cycle when not monitoring the control channel for receiving the fourth DCI prior to the next long DRX cycle.

In some embodiments, at least one secondary cell in the primary DRX group and at least one secondary cell in the secondary DRX group follow at least one of the wake-up indication or the dormancy indication.

In some embodiments, at least one secondary cell in the primary DRX group follows at least one of the wake-up indication or the dormancy indication of the fourth DCI.

In some embodiments, at least one secondary cell in the secondary DRX group follows at least one of the wake-up indication or the dormancy indication of the fourth DCI.

In some embodiments, the dormancy indication is applied to at least one serving cell of the secondary DRX group based on at least one of predefined information, a higher layer signaling, or N bits, where N≥1, in the fourth DCI.

In some embodiments, the higher layer signaling comprises at least one of a radio resource control parameter or an MAC control entity.

In some embodiments, the method further comprises receiving the DCI in one of the primary DRX group and the secondary DRX group, wherein the DCI includes at least one of a first indication indicating a search space set group switching or a second indication indicating a physical downlink control channel, PDCCH, skipping.

In some embodiments, at least one serving cell in the one of the primary DRX group and the secondary DRX group in which the DCI is received follows at least one of the first indication or the second indication.

In some embodiments, at least one serving cell in another one of the primary DRX group in which the DCI is not received ignores at least one of the first indication or the second indication.

In some embodiments, when the DCI is received within an active time of at least one of the primary DRX group or the secondary DRX group and the method comprises following at least one of the first indication or the second indication.

In some embodiments, the DCI is received outside of an active time of at least one of the primary DRX group or the secondary DRX group and the method further comprises ignoring at least one of the first indication or the second indication.

The present disclosure relates to a method for use in a base station. The method comprises configuring, to a user equipment, UE, a medium access control, MAC, entity comprising a primary discontinuous reception, DRX, group and a secondary DRX group, and transmitting downlink control information, DCI, on a control channel in at least one serving cell in at least one of the primary DRX group and the secondary DRX group.

Various embodiments may In some embodiments implement the following features:

In some embodiments, the DCI is a first DCI transmitted outside an active time of at least one of the primary DRX group or the secondary DRX group, wherein the first DCI comprises a wake-up indication.

In some embodiments, the transmitting the DCI on the control channel in at least one serving cell in at least one of the primary DRX group and the secondary DRX group comprises, on physical downlink control channel monitoring occasions prior to a next DRX cycle:

transmitting the first DCI on a first cell of the primary DRX group, or transmitting the first DCI on a second cell of the secondary DRX group, or transmitting the first DCI on the first cell of the primary DRX group and transmitting the first DCI on the second cell of the secondary DRX group.

In some embodiments, the first DCI comprises at least one of a predefined information, a higher layer signaling or C bits, where C 1, for indicating whether at least one serving cell in the primary DRX group and at least one serving cell in the secondary DRX group follows the wake-up indication of the first DCI.

In some embodiments, the higher layer signaling comprises at least one of a radio resource control parameter or an MAC control entity.

In some embodiments, the wake-up indication comprises M bits, where M≥1, indicating starting or not starting a timer associated with a DRX-On duration for the primary DRX group and the secondary DRX group.

In some embodiments, the wake-up indication comprises N=N1+N2 bits, where N≥1, N1 is a number of bit(s) indicating starting or not starting a timer associated with a DRX-On duration for the primary DRX group, and N2 is a number of bit(s) indicating starting or not starting a timer associated with a DRX-On duration for the secondary DRX group.

In some embodiments, the DCI is a second DCI comprising a dormancy indication, wherein the second DCI is transmitted outside an active time of at least one of the primary DRX group or the secondary DRX group and the dormancy indication indicates a dormancy behavior of at least one serving cell in at least one of the primary DRX group or the secondary DRX group.

In some embodiments, the transmitting the DCI on the control channel in at least one serving cell in at least one of the primary DRX group and the secondary DRX group comprises:

transmitting the second DCI on a first cell of the primary DRX group, or transmitting the second DCI on a second cell of the secondary DRX group, or transmitting the second DCI on the first cell of the primary DRX group and transmitting the second DCI on the second cell of the secondary DRX group.

In some embodiments, the DCI is a third DCI comprising a dormancy indication, wherein the third DCI is transmitted within an active time of at least one of the primary DRX group or the secondary DRX group and the dormancy indication indicates a dormancy behavior of at least one serving cell in at least one of the primary DRX group or the secondary DRX group.

In some embodiments, the transmitting the DCI on the control channel in at least one serving cell in at least one of the primary DRX group and the secondary DRX group comprises:

transmitting the third DCI on a first cell of the primary DRX group, or transmitting the third DCI on a second cell of the secondary DRX group, or transmitting the third DCI on the first cell of the primary DRX group and transmitting the third cell of the secondary DRX group.

In some embodiments, the third DCI comprises N bits, where N≥1, indicating whether the dormancy indication is enabled for at least one secondary cell in the primary DRX group and at least one secondary cell in the secondary DRX group.

In some embodiments, the dormancy indication transmitted in one of the primary DRX group and the secondary DRX group indicates the dormancy behavior of at least one serving cell in the DRX group in which the dormancy indication is received.

In some embodiments, the dormancy indication transmitted in one of the primary DRX group and the secondary DRX group indicates the dormancy behavior of at least one serving cell in the primary DRX group and at least one serving cell in the secondary DRX group.

In some embodiments, the DCI is a fourth DCI transmitted outside an active time of at least one of the primary DRX group or the secondary DRX group, wherein the fourth DCI comprises a wake-up indication and a dormancy indication.

In some embodiments, the transmitting the DCI on the control channel in at least one serving cell in at least one of the primary DRX group and the secondary DRX group comprises, on physical downlink control channel monitoring occasions prior to a next DRX cycle:

transmitting the fourth DCI on a first cell of the primary DRX group, or transmitting the fourth DCI on a second cell of the secondary DRX group, or transmitting the fourth DCI on the first cell of the primary DRX group and transmitting the fourth DCI on the second cell of the secondary DRX group.

In some embodiments, the fourth DCI indicates starting or not starting a timer associated with a DRX-On duration and dormancy behavior related operations in one of the primary DRX group and the secondary DRX group.

In some embodiments, the fourth DCI indicates the UE to start or not a timer associated with a DRX-On duration and dormancy behavior related operations in the primary DRX group and the secondary DRX group.

In some embodiments, the dormancy indication is applied to at least one serving cell of the secondary DRX group based on at least one of predefined information, a higher layer signaling, or N bits, where N≥1, in the fourth DCI.

In some embodiments, the higher layer signaling comprises at least one of a radio resource control parameter or an MAC control entity.

In some embodiments, the DCI includes at least one of a first indication indicating a search space set group switching or a second indication indicating a physical downlink control channel, PDCCH, skipping.

The present disclosure relates to a user equipment, wherein a Medium Access Control, MAC, entity of the UE, comprises a primary discontinuous reception, DRX, group and a secondary DRX group, the user equipment comprising a processor configured to monitor a control channel for receiving downlink control information, DCI, in at least one serving cell in at least one of the primary DRX group or the secondary DRX group.

Various embodiments may In some embodiments implement the following feature:

In some embodiments, the processor is further configured to perform any one of the foregoing methods.

The present disclosure relates to a base station, comprising:

a processor configured to configure, to a user equipment, UE, a medium access control, MAC, entity comprising a primary discontinuous reception, DRX, group and a secondary DRX group, and a communication unit, configured to transmit downlink control information, DCI, on a control channel in at least one serving cell in at least one of the primary DRX group and the secondary DRX group.

Various embodiments may In some embodiments implement the following feature:

In some embodiments, the processor is further configured to perform any one of the foregoing methods.

The present disclosure relates to a computer program product comprising a computer-readable program medium code stored thereupon, the code, when executed by a processor, causing the processor to implement a signal processing method recited in any one of the foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

DETAILED DESCRIPTION

Figure 1:
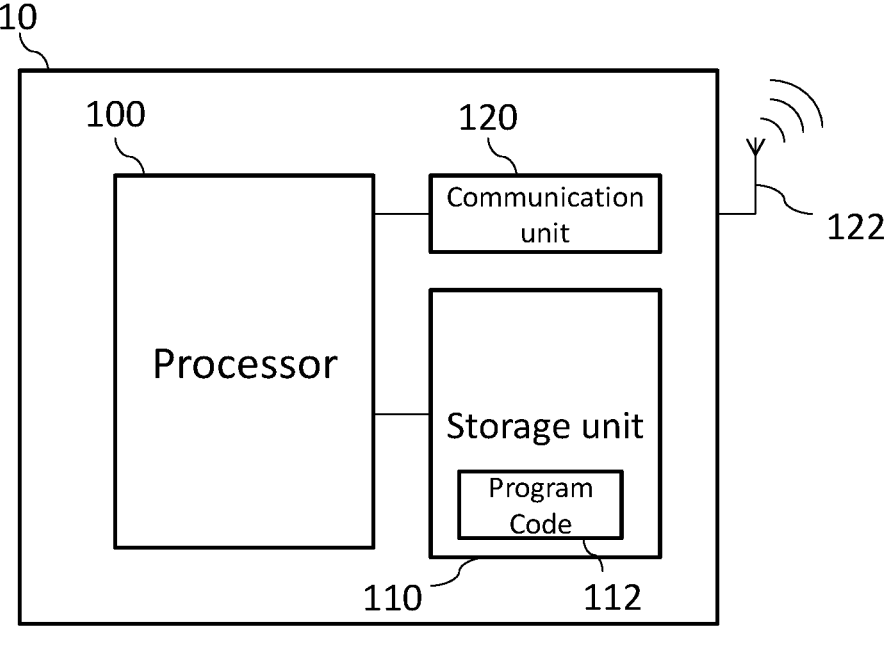
FIG. 1 shows an example of a schematic diagram of a wireless terminal in an embodiment of the present disclosure.

FIG. 1 relates to a schematic diagram of a wireless terminal 10 in an embodiment of the present disclosure. The wireless terminal 10 may be a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 110 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via at least one antenna 122 shown in FIG. 2.

In an embodiment, the storage unit 110 and the program code 112 may be omitted and the processor 100 may include a storage unit with stored program code.

The processor 100 may implement any one of the steps in exemplified embodiments on the wireless terminal 10, e.g., by executing the program code 112.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figures 2, 3:
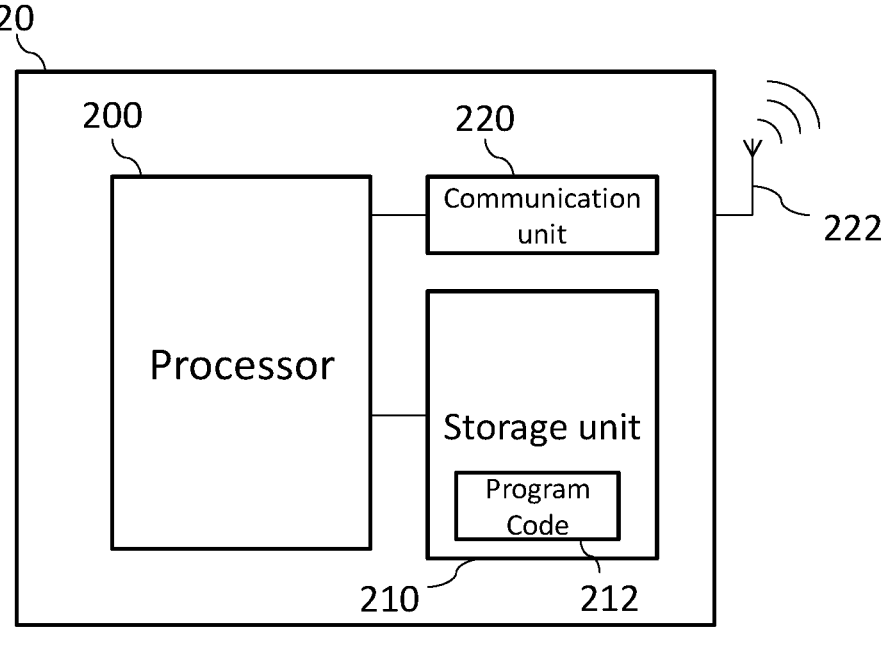
FIG. 2 shows an example of a schematic diagram of a wireless network node in an embodiment of the present disclosure.
FIG. 3 shows a flowchart of a process according to an embodiment of the present disclosure.

FIG. 2 relates to a schematic diagram of a wireless network node 20 in an embodiment of the present disclosure. The wireless network node 20 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 20 may comprise (perform) at least one network function such as an access and mobility management function (AMF), a session management function (SMF), a user place function (UPF), a policy control function (PCF), an application function (AF), etc. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 210 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 3.

In an embodiment, the storage unit 210 and the program code 212 may be omitted. The processor 200 may include a storage unit with stored program code.

The processor 200 may implement any steps described in exemplified embodiments on the wireless network node 20, e.g., via executing the program code 212.

The communication unit 220 may be a transceiver. The communication unit 220 may as an alternative or in addition be combining a transmitting unit and a receiving unit configured to transmit and to receive, respectively, signals to and from a wireless terminal (e.g. a user equipment).

In an embodiment, the DRX state is equal to DRX status and is used to indicate that related serving cell(s) is in a DRX-ON duration or in a DRX-OFF duration.

Embodiment 1

Under certain conditions, the introduction of a secondary discontinuous reception, DRX, group may cause the DRX state of serving cells in the same cell group (MCG or SCG) to be not aligned. Therefore, when the secondary DRX group and a wake-up indication are applied at the same time, incompatible or unclear operations may occur. To solve this problem, this embodiment proposes to use the secondary DRX group function and wake-up indication function at the same time.

In an embodiment, a UE is configured with the DRX mode and the Serving Cells of the UE are configured by a control, e.g. the radio resource control, RRC, in two DRX groups. The DRX group with SpCell may be called primary DRX group (legacy DRX group). Another DRX group may be called secondary DRX group. For example, for the master cell group (MCG), the DRX group containing the PCell is the primary DRX group (legacy DRX group), and the other group is called secondary DRX group. For the secondary cell group (SCG), the DRX group containing the PSCell may be the primary DRX group (legacy DRX group), and the other group is called secondary DRX group. The two DRX groups are configured by the control, e.g. the RRC, with its own set of parameters, e.g. DRX-onDurationTimer, i.e. a parameter indicating the "on time"/active time at the beginning of one DRX cycle, DRX-InactivityTimer, i.e. a parameter indicating specifying how long the UE should remain "on"/active after reception of a physical downlink control channel that indicates a new uplink, UL, or downlink, DL, transmission for the Medium Access Control (MAC) entity, and share the others DRX related parameter values.

In an embodiment, a number of search space sets are configured to monitor a respective channel, e.g. a physical downlink control channel, PDCCH, for the detection of the downlink control information (DCI) in the active DL, bandwidth part (BWP). In an embodiment, the DCI is the first DCI, which is transmitted outside active time and has a wake-up indication. For example, the first DCI is DCI format 2_6 ignores the dormancy indication bit field. In an embodiment, the first DCI is only transmitted in a SpCell. In an embodiment, the first DCI is transmitted in multiple serving cells, such as SpCell and SCell.

In an embodiment, a wake up signal, WUS, refers to the DCI with a wake-up indication bit field.

In an embodiment, when the UE is configured with a secondary DRX group, the UE only monitors the first DCI in the SpCell. In an embodiment, there is M bit, M≥1, in the first DCI to indicate the UE to start or not to start the DRX-onDurationTimer, i.e. the wake-up indication bit field includes M bit.

In an embodiment, the first DCI can be monitored in the SpCell when both DRX groups are outside the active time and this coincides with corresponding PDCCH monitoring occasions prior to a next DRX cycle. In an embodiment, the DRX cycle refers to the long DRX cycle. When one DRX group is outside the active time and the other DRX group is within the active time, the UE does not monitor the first DCI. In an embodiment, when one DRX group is in a long DRX cycle and the other DRX group is in a short DRX cycle, the UE does not monitor the first DCI. When the first DCI is detected, serving cells in both DRX groups follow the wake-up indication bit field. In an embodiment, when the UE does not monitor the first DCI, the serving cells in both DRX groups start a DRX-onDurationTimer in the next DRX cycle. In an embodiment, the wake-up indication bit field includes 1 bit, and '0' value in the wake-up indication bit field refers to an indication not to start the DRX-onDurationTimer for the next long DRX cycle, a '1' value indicates to start the DRX-onDurationTimer for the next long DRX cycle.

In an embodiment, the UE monitors the first DCI in the SpCell according to the DRX status of the serving cells in the primary DRX group. That is, the UE monitors the first DCI in the SpCell when the serving cells in the primary DRX groups are outside active time on PDCCH monitoring occasions prior to a next DRX cycle. In an embodiment, the DRX cycle refers to a long DRX cycle. For example, on the PDCCH monitoring occasions prior to a next DRX cycle, if the serving cells in primary DRX group are outside an active time (irrespective of the serving cells in secondary DRX group being outside the active time or within the active time), the UE monitors the first DCI. Otherwise, the UE does not monitor the first DCI. In an embodiment, when the UE does not monitor the first DCI, serving cells in both DRX groups start the DRX-onDurationTimer in the next DRX cycle. In an embodiment, the first DCI is only enabled for a long DRX cycle.

According to an embodiment, the serving cells in the primary DRX group follow the wake-up indication bit field in the first DCI. The serving cells in the primary DRX group start or do not start the DRX-onDurationTimer according to the value of wake-up indication bit field in the first DCI, the serving cells in the secondary DRX group ignore the indication of the first DCI. In an embodiment, the serving cells in the secondary DRX groups will start the DRX-onDurationTimer in the next DRX cycle. According to another embodiment, the serving cells in the secondary DRX groups will not start the DRX-onDurationTimer in the next DRX cycle. According to another embodiment, the serving cells in the secondary DRX groups start or not start the DRX-onDurationTimer in the next DRX cycle according to a higher layer signaling (e.g. an RRC parameter or an MAC control entity (CE)).

In the present disclosure, the higher layer signaling may be equal to a higher layer parameter or a higher layer message. In addition, the higher layer may be a network layer higher than physical layer (e.g. MAC layer or RRC layer).

According to an embodiment, the serving cells in both DRX groups follow the wake-up indication bit field in the first DCI. The serving cells in both DRX groups start or do not start the DRX-onDurationTimer according to the value of wake-up indication bit field.

According to an embodiment, the serving cells in primary DRX group follow the wake-up indication bit field in the first DCI when the DRX state of two DRX groups are same. In an embodiment, the serving cells in both DRX groups start or do not start DRX-onDurationTimer according to the value of wake-up indication bit field in the first DCI when the DRX state of two DRX groups are the same. In an embodiment, the DRX state of two DRX groups are the same which means that the serving cells in two DRX groups are all outside an active time and the two DRX groups are all in a long DRX cycle. Otherwise, the serving cells in the primary DRX group follow the wake-up indication in the first DCI and the serving cells in the secondary DRX group ignore the indication in the first DCI. In an embodiment, when the secondary DRX group ignores the wake-up indication, the serving cells in the secondary DRX group start the DRX-onDurationTimer in the next DRX cycle. In an embodiment, when the secondary DRX group ignores the wake-up indication, the serving cells in the secondary DRX groups do not start the DRX-onDurationTimer in the next DRX cycle. In an embodiment, when the secondary DRX group ignores the wake-up indication, the serving cells in secondary DRX groups start or do not start the DRX-onDurationTimer in the next DRX cycle according to a higher layer signaling, e.g. an RRC parameter or an MAC CE.

According to an embodiment, the serving cells in the primary DRX group follow the wake-up indication in the first DCI. Whether the serving cells in the secondary DRX group ignore or do not ignore the wake-up indication in the first DCI is determined by a higher layer signaling (e.g. an RRC parameter or an MAC CE).

According to an embodiment, the serving cells in the primary DRX group follow the wake-up indication in the first DCI. Whether the serving cells in the secondary DRX group ignore or do not ignore the wake-up indication in the first DCI is indicated by one bit besides the wake up indication in the first DCI. For example, when the bit is "0", the secondary DRX group ignores the first DCI; when the bit is "1", the secondary DRX group follows the indication in the first DCI. That is, when the bit is "1", whether the secondary DRX group start or not start the DRX-onDurationTimer is depending on the wake up indication.

According to an embodiment, whether the serving cells in the primary DRX group and secondary DRX group follow the wake-up indication in the first DCI are indicated by C bit, $C \geq 1$, besides the wake up indication in the first DCI. For example, C equals to 2. And when the bit is "01", the primary DRX group follows the wake up indication and the secondary DRX group ignores the wake up indication in first DCI; when the bit is "10", the primary DRX group ignores the wake up indication and the secondary DRX group follows the wake up indication in first DCI; when the bit is "11", both the primary DRX group and the secondary DRX group follows the wake up indication in first DCI. Wherein, follow the wake up indication means that whether the DRX group start or not start the DRX-onDurationTimer is depending on the wake up indication.

The UE only monitoring the first DCI in the SpCell has the advantageous effect that it has negligible impact on an existing protocol which leads to compliant behavior of the base station and the UE to existing or future standards. In addition, the present disclosure leads to less signal transmission and reception thus reducing the overhead of base stations and UEs. Further, the usage of both the secondary DRX and WUS technologies can obtain more power saving gain.

In an embodiment, there are N bits in the first DCI (which is also called enhanced WUS in the following text) to indicate the UE to start or not to start DRX-onDurationTimer, i.e. the wake-up indication bit field includes N bits. In an embodiment, N=N1+N2 and N>1, with N1 and N2 being integers, where N1 bit(s) of the wake-up indication bit field indicate(s) the operation of the primary DRX group, and N2 bit(s) of the wake-up indication bit field indicate(s) the operation of the secondary DRX group, with the operation being starting or not starting the DRX-onDurationTimer, e.g. N=2, N1=N2=1. In an embodiment, the bit "0" indicates that the DRX group does not start the DRX-onDurationTimer for the next long DRX cycle; bit "1" indicates that the DRX group starts the DRX-onDurationTimer for the next long DRX cycle. For example, the wake-up indication bit field is "10", then the serving cells in primary DRX groups start the DRX-onDurationTimer in the next DRX cycle, and the serving cells in secondary DRX groups do not start the DRX-onDurationTimer in the next DRX cycle. In an embodiment, the enhanced WUS can be monitored in the SpCell only when both DRX groups are outside an active time on the PDCCH monitoring occasions prior to a next DRX cycle. In an embodiment, the UE monitors or does not monitor the enhanced WUS in the SpCell according to the DRX status of the serving cells in primary DRX group. In an embodiment, the first DCI is only enabled for a long DRX cycle. In an embodiment, the first DCI is both enabled for a long DRX cycle and a short DRX cycle.

The present disclosure can increase the UE operation flexibility without increasing the decoding complexity. The two DRX groups can wake up or not wake up alone, which does not only have no effect on the data scheduling service of the UE, but also leads to a power saving effect of the UE.

In an embodiment, the UE monitors the first DCI in two DRX groups separately. For the primary DRX group, the UE monitors the first DCI in the SpCell. For the secondary DRX group, the UE monitors the first DCI in a dedicated SCell (which is called secondary-primary cell in the following). In an embodiment, the dedicated SCell is a predefined SCell. In an embodiment, the dedicated SCell is configured by higher layer signaling. In an embodiment, the dedicated SCell is the SCell used for scheduling PCell/PSCell. In an embodiment, the UE monitors or does not monitor the first DCI only according to the DRX status of the serving cells in corresponding DRX group. For example, when the primary DRX group is outside an active time and the secondary DRX is within an active time, then the UE monitors the first DCI on SpCell but does not monitor the first DCI on secondary-primary cell. For example, when the primary DRX group is within active time and the secondary DRX is outside active time, then the UE monitors the first DCI on secondary-primary cell but does not monitor the first DCI on SpCell. In an embodiment, the wake-up indication bit field for two DRX groups is the same. In an embodiment, the WUS detected in SpCell only indicates the operation of primary DRX group, and the WUS detected in secondary-primary cell only indicates the operation of secondary DRX group. In an embodiment, the WUS detected in one DRX group can indicate the operation in two DRX group. In an embodiment, the wake-up indication bit field for two DRX groups can be different. In an embodiment, the WUS detected in one DRX group can only indicate the operation in a corresponding DRX group, where the operation is to start or not to start the DRX-onDurationTimer. For example, when the bit is "0", the secondary DRX group ignores the first DCI; when the bit is "1", the secondary DRX group follows the indication in the first DCI. In an embodiment, the UE monitors the first DCI on two DRX groups separately. In an embodiment, the UE monitors or does not monitor the first DCI only according to the DRX status of the serving cells in corresponding DRX group. In an embodiment, the N bits wake-up indication indicate the operation of two DRX groups separately. In an embodiment, UE can monitor the first DCI on two DRX group. In an embodiment, UE only monitors the first DCI in the SpCell when both DRX groups corresponding PDCCH monitoring occasions prior to a next DRX cycle are outside the active time.

The above embodiments can significantly reduce the possibility of misdetection of a WUS and increase the flexibility of the UE operation, i.e. to wake up or not to wake up, in two DRX groups. Good power saving effect can also be obtained.

In an embodiment, if a UE are configured search space sets to monitor the PDCCH in order to detect the first DCI in the active DL BWP and the UE does not detect the first DCI, both DRX groups indicate by a respective parameter, ps-WakeupOrNot, whether the UE shall start or not start the DRX-onDurationTimer for the next DRX cycle. Alternatively, if a UE has activated search space sets to monitor the PDCCH for detection of the first DCI in the active DL BWP and the UE does not detect the first DCI, the two DRX groups are indicated by two parameters individually. For example, a first parameter, e.g. ps-WakeupOrNot-Primary-DRXGroup, indicates the serving cell in the primary DRX group to start or not to start the DRX-onDurationTimer for the next DRX cycle. And a second parameter, e.g. ps-WakeupOrNot-SecondaryDRXGroup, indicates the serving cell in secondary DRX group to start or not to start the DRX-onDurationTimer for the next DRX cycle.

Embodiment 2

Under certain conditions, the introduction of the secondary DRX group will cause the DRX state of serving cells in the same cell group (MCG or SCG) to be not aligned. Therefore, when the secondary DRX group and SCell dormancy indication are applied at the same time, incompatible or unclear operations may occur. To solve this problem, this embodiment provides enables using the secondary DRX group function and SCell dormancy indication at the same time.

In an embodiment, a UE has an enabled DRX mode and the Serving Cells of the UE are configured by a control, e.g. the RRC, in two DRX groups. In an embodiment, the DRX group with SpCell is called primary DRX group (legacy DRX group). According to this embodiment, another DRX group is called secondary DRX group. For example, for the master cell group (MCG), the DRX group containing the PCell is the primary DRX group (legacy DRX group), and the other group is called the secondary DRX group. For the secondary cell group (SCG), the DRX group containing the PSCell is the primary DRX group (legacy DRX group), and the other group is called the secondary DRX group. The two DRX groups are configured by the control, e.g. the RRC, with its own set of parameters, e.g. DRX-onDurationTimer, DRX-InactivityTimer, and they share the others DRX related parameter values.

In an embodiment, a number of search space sets are configured to monitor a respective channel, e.g. a PDCCH, for the detection of the DCI in the active DL BWP. Alternatively, the DCI is the second DCI, which is transmitted outside an active time and has a dormancy indication. For example, the second DCI is the DCI format 2_6 described in Rel-16 of 5G ignores the wake up indication bit field. In an embodiment, the second DCI is only transmitted in SpCell. In an embodiment, the second DCI is transmitted in multiple serving cells, such as SpCell and SCell.

In an embodiment, when the UE is configured with the secondary DRX group, the UE only monitors the second DCI in the SpCell.

In an embodiment, the second DCI can be monitored in the SpCell when both DRX groups are outside the active time on PDCCH monitoring occasions prior to a next DRX cycle. In an embodiment, the DRX cycle refers to the long DRX cycle. When one DRX group is outside active time and the other within active time, the second DCI is not monitored. In an embodiment, the UE monitors or does not monitor the second DCI on SpCell according to the DRX status of the serving cells in the primary DRX group. That is, the UE monitors the second DCI on SpCell when the serving cells in the primary DRX groups corresponding PDCCH monitoring occasions prior to a next DRX cycle are outside an active time.

In an embodiment, when the second DCI is detected, the SCells of the UE are grouped according to a higher layer parameter, such as dormancyGroupOutsideActiveTime, regardless of whether the DRX status of the activated SCell is in outside active time or within active time.

In an embodiment, the activated BWP of the activated SCells in two DRX groups is indicated by a dormancy indication (bitmap) of the second DCI. That is, the dormancy indication is enabled for both the primary DRX group and the secondary DRX group irrespective of whether the DRX status of two DRX group are the same or not. In an embodiment, a '0' value for a bit of the dormancy indication indicates that the active DL BWP is a dormant BWP for activated SCells in the corresponding SCell group. In an embodiment, a '1' value for a bit of the dormancy indication indicates that the active DL BWP is a non-dormant BWP for activated SCells in the corresponding SCell group.

In an embodiment, only the activated SCells in the primary DRX group follow the dormancy indication (bitmap) of the second DCI irrespective of whether the DRX status of two DRX groups are the same or not. That is, when the dormancy indication is enabled for the primary DRX group but not enabled for secondary DRX group, the activated SCells in the secondary DRX group ignore the dormancy indication irrespective of whether the DRX status of two DRX groups is the same or not. For example, the first bit of the dormancy indication is "0", then the active DL BWP of the activated SCells belonging to both the first SCell group configured by the higher layer parameter and the primary DRX group are indicated as a dormant BWP. The activated SCells belonging to the first SCell group and the secondary DRX group ignore the dormancy indication.

In an embodiment, both the activated SCells in the primary DRX group and the activated SCells in the secondary DRX group follow the dormancy indication (bitmap) of the second DCI when the DRX status of two DRX groups is same. That is, the dormancy indication is enabled for both the primary DRX group and the secondary DRX group when the DRX status of two DRX groups is same. In an embodiment, only the activated SCells in the primary DRX group follow the dormancy indication (bitmap) of the second DCI when the DRX status of two DRX groups are different. For example, when the activated SCells in the primary DRX group are outside the active time and the activated SCells in the secondary DRX group are within the active time, the UE monitors the second DCI in SpCell, and the dormancy indication is enabled for the primary DRX group but not enabled for the secondary DRX group, the activated SCells in secondary DRX group ignore the dormancy indication.

In an embodiment, the activated SCells in the primary DRX group follow the dormancy indication (bitmap) of the second DCI. Whether the SCells of the secondary DRX group enable the dormancy indication depends on the indication information. For example, the active DL BWP of SCell in the secondary DRX group are indicated as a dormant BWP and the SCell ignores the dormancy indication; the active DL BWP of SCell in the secondary DRX group are indicated non-dormant BWP and the SCell follows the dormancy indication.

In an embodiment, whether the SCells in the primary DRX group and/or in the secondary DRX group ignore or do not ignore the dormancy indication in the second DCI is determined by a higher layer signaling (e.g. an RRC parameter or an MAC CE).

In an embodiment, whether the SCells in the primary DRX group and/or in the secondary DRX group ignore or do not ignore the dormancy indication in the second DCI is indicated by N bit, N≥1, besides the dormancy indication in the second DCI. For example, N equals to 1, the SCells in the primary DRX group follow the dormancy indication of the second DCI, and when the bit is "0", the secondary DRX group ignores the second DCI; and when the bit is "1", the secondary DRX group follows the indication in the second DCI. For example, N equals to 2. And when the bit is "01", the primary DRX group follows the dormancy indication and the secondary DRX group ignores the dormancy indication in second DCI; when the bit is "10", the primary DRX group ignores the dormancy indication and the secondary DRX group follows the dormancy indication in second DCI; when the bit is "11", both the primary DRX group and the secondary DRX group follows the dormancy indication in second DCI. Wherein, follow the dormancy indication means that whether the UE performs dormant BWP and non-dormant BWP switching according to the value of dormancy indication.

In an embodiment, the dormancy indication is enabled and thus, the active DL BWP of corresponding activated SCells are indicated by the dormancy indication.

According to the present disclosure, a UE only monitoring the second DCI in the SpCell has the advantageous effect that it has negligible impact on an existing protocol which leads to compliant behavior of the base station and the UE to existing or future standards. Further, the usage of both the secondary DRX and dormancy indication can increase the power saving gain.

In an embodiment, the UE monitors the second DCI in two DRX groups separately. For the primary DRX group, the UE monitors the second DCI in the SpCell. For the secondary DRX group, the UE monitors the second DCI in a dedicated SCell (which is called secondary-primary cell in the following). In an embodiment, the dedicated SCell is a predefined SCell. In an embodiment, the dedicated SCell is configured by the higher layer signaling, such as an RRC parameter or an MAC CE. In an embodiment, the dedicated SCell is the SCell used for scheduling PCell/PSCell.

In an embodiment, when the activated SCells follow the dormancy indication in the second DCI, i.e., the second DCI is enabled for the activated SCells, the activated SCells are grouped according to a higher layer parameter, dormancy-GroupOutsideActiveTime, regardless of whether the DRX status of the activated SCell is outside an active time or within an active time.

In an embodiment, the UE monitors or does not monitor the second DCI only according to the DRX status of the serving cells in a corresponding DRX group. For example, the primary DRX group is outside the active time and the secondary DRX is within the active time, then the UE monitors the second DCI in the SpCell but does not monitor the second DCI in the secondary-primary cell. For example, the primary DRX group is within active time and the secondary DRX is outside active time, then the UE monitors the second DCI in the dedicated SCell in secondary DRX group but does not monitor the second DCI in the SpCell in primary DRX group. In an embodiment, the dormancy indication bit field for the two DRX groups is same. In an embodiment, the dormancy indication (of the second DCI) detected in the SpCell only indicates the dormancy behavior of the primary DRX group, and the dormancy indication (of the second DCI) detected in the secondary-primary cell only indicates the dormancy behavior of the secondary DRX group. In an embodiment, the dormancy indication (of the second DCI) detected in one DRX group can indicate the dormancy behavior in two DRX groups. In an embodiment, the dormancy indication bit field for two DRX groups can be different, and—according to an embodiment—the bitmap size can be different as well. In an embodiment, the dormancy indication (of the second DCI) detected in one DRX group can only indicate the dormancy behavior of the SCell in its corresponding DRX group.

The aforementioned embodiments have the advantageous effect that because the UE is configured with both, the secondary DRX group and the dormancy indication at the same time, the aforementioned ambiguities of the UE behavior are solved. In addition, the power saving gain can be increased without affecting the data receiving function of the UE.

In an embodiment, the UE does not expect the SCell in one SCell group (irrespective of whether the SCell group is outside an active time or within an active time) to have two different DRX parameter configurations. That is, one DRX group can contain multiple SCell groups, but one SCell group can only correspond to one DRX group. In an embodiment, the UE does not expect the SCell in one SCell group (no matter the SCell group outside active time or within active time) to belong to two frequency ranges.

In an embodiment, when the SCells in a SCell group contain two different DRX parameter configurations, the dormancy indication received by the current DRX group only works in the SCells with the same DRX configuration as the current DRX group. Alternatively, when the SCells in a SCell group correspond to two DRX groups, the dormancy indication received by the current DRX group only works in the SCells in the current DRX group.

In an embodiment, when the SCell corresponds to a '1' (enabled) value of the dormancy indication in the second DCI, and the current active DL BWP is the dormant DL BWP, then an active DL BWP, provided a the higher layer parameter, such as firstOutsideActiveTimeBWP-Id, is indicated.

Embodiment 3

Under certain conditions, the introduction of the secondary DRX group will cause the DRX state of the serving cells in the same cell group (MCG or SCG) to be not aligned. Therefore, when the secondary DRX group and the SCell dormancy indication are applied at the same time, incompatible or unclear operations may occur. To solve this problem, this embodiment uses the secondary DRX group function and the SCell dormancy indication at the same time, especially for the case that the DRX status of the SCells in the primary DRX group and the secondary DRX group are different.

In an embodiment, a UE configured with the DRX mode and the Serving Cells of the UE are configured by a control, e.g. an RRC, in two DRX groups. In an embodiment, the DRX group with the SpCell is called primary DRX group (legacy DRX group). Another DRX group is called secondary DRX group. For example, for the master cell group (MCG), the DRX group containing the PCell is the primary DRX group (legacy DRX group), and the other group is called secondary DRX group. For the secondary cell group (SCG), the DRX group containing the PSCell is the primary DRX group (legacy DRX group), and the other group is called secondary DRX group. The two DRX groups are configured by the control, e.g. the RRC, with its own set of parameters, e.g. DRX-onDurationTimer, DRX-Inactivity-Timer, and share the others DRX related parameter values.

In an embodiment, a number of search space sets are configured to monitor a respective channel, e.g. the PDCCH, for the detection of the DCI in the active DL BWP. Alternatively, the DCI is the third DCI, which is transmitted within an active time and has a dormancy indication. For example, the third DCI is the DCI format 0_1 and/or DCI format 1_1 with a SCell dormancy indication field described in 5G Rel-16. In an embodiment, the third DCI is only transmitted in SpCell. In an embodiment, the second DCI is transmitted in multiple serving cells, such as SpCell and SCells.

In an embodiment, when the UE is configured with secondary DRX group, the UE only monitors the third DCI in the SpCell.

In an embodiment, the dormancy indication within the active time refers to the third DCI.

In an embodiment, the UE detects a dormancy indication within the active time in the SpCell when both DRX groups are within a active time, the SCells of the UE are grouped according to a higher layer parameter, for example dormancyGroupWithinActiveTime (in Rel-16), and the activated DL BWP in the corresponding activated SCells both in the primary DRX group and the secondary DRX group are indicated by the dormancy indication within an active time (bitmap). In an embodiment, the UE detects the dormancy indication within the active time in the SpCell when both DRX groups are within the active time, the SCells of the UE are grouped according to the higher layer parameter, for example dormancyGroupWithinActiveTime, and the activated DL BWP in the corresponding activated SCells in primary DRX group are indicated by the dormancy indication within an active time (bitmap), and the SCells in secondary DRX group ignore the dormancy indication within an active time (bitmap).

In an embodiment, when the UE detects a dormancy indication in the SpCell within the active time, the following schemes can be selected.

In an embodiment, the activated SCells of the UE are grouped according to a higher layer parameter, e.g. the dormancyGroupWithinActiveTime. In an embodiment, the activated SCells both in the primary DRX group and the secondary DRX group follow the dormancy indication within the active time. In an embodiment, the activated SCells both in the primary DRX group and the secondary DRX group ignore the dormancy indication within the active time. In an embodiment, the activated SCells in the primary DRX group follow the dormancy indication within the active time, and the activated SCells in the secondary DRX group ignore the dormancy indication within the active time. In an embodiment, the activated SCells in the primary DRX group follow the dormancy indication within the active time. Whether the SCells of the secondary DRX group follow the dormancy indication depends on the indication information. For example, the active DL BWP of the SCell in the secondary DRX group are indicated to the dormant BWP and the SCell ignores the dormancy indication within an active time. The active DL BWP of SCells in the secondary DRX group are indicated as non-dormant BWP and the SCells follow the dormancy indication within an active time.

In an embodiment, following the dormancy indication within the active time means that the UE sets the active DL BWP to the indicated active DL BWP. For example, a '0' value for a bit of the bitmap (dormancy indication within active time) indicates an active DL BWP, provided by the dormant-BWP-Id, and a '1' value for a bit of the bitmap indicates an active DL BWP, provided by a non-dormant-BWP, e.g. using a respective parameter, e.g. firstWithinActiveTimeBWP-Id, (if a current active DL BWP is the dormant DL BWP), or using a current active DL BWP (if the current active DL BWP is not the dormant DL BWP). In an embodiment, for the activated SCells in the secondary DRX group, a '1' (enabled) value for a bit of the bitmap indicates an active DL BWP, e.g. provided by a respective parameter, e.g. firstWithinActiveTimeBWP-Id, if a current active DL BWP is the dormant DL BWP.

In an embodiment, there are N bits (N≥1) in the third DCI to indicate whether the dormancy indication within the active time is enabled for the active SCells in the primary DRX group and/or the active SCells in the secondary DRX group. In an embodiment, the bit(s) is/are located immediately after the bitmap (SCell dormancy indicator). In an embodiment, the bit(s) is/are located before the SCell dormancy indicator (immediately before the bitmap dormancy indicator). In an embodiment, when N=1, the bit 'c1', indicates that the activated SCells in the primary/secondary DRX group do not perform the operation according to the dormancy indication, and the bit 'c2', indicates that the activated SCells in primary/secondary DRX group perform the operation according to the dormancy indication. In an embodiment, 'c1' is 0 or 1, and 'c2' is 0 or 1. In an embodiment, when N=2, the bits "01" indicate the primary DRX group follows the dormancy indication and the secondary DRX group ignores the dormancy indication in third DCI; the bits "10" indicate the primary DRX group ignores the dormancy indication and the secondary DRX group follows the dormancy indication in third DCI; the bits "11" indicate both the primary DRX group and the secondary DRX group follows the dormancy indication in third DCI. "Follow the dormancy indication" means that whether the UE performs dormant BWP and non-dormant BWP switching according to the value of dormancy indication.

In an embodiment, the UE can monitor the third DCI with the dormancy indication in two DRX groups separately. For the primary DRX group, the UE monitors the third DCI in the SpCell. For the secondary DRX group, the UE monitors the third DCI in a dedicated SCell (which is called secondary-primary cell in the following). In an embodiment, the dedicated SCell is a predefined SCell. In an embodiment, the dedicated SCell is configured by higher layer signaling, such as RRC parameter or an MAC CE. In an embodiment, the dedicated SCell is the SCell used for scheduling PCell/PSCell.

In an embodiment, the dormancy indication within the active time detected in SpCell only indicates the dormancy behavior of activated SCells in the primary DRX group, and the dormancy indication within the active time detected in the secondary-primary cell only indicates the dormancy behavior of activated SCells in the secondary DRX group. In an embodiment, the dormancy indication within the active time detected in one DRX group can indicate the dormancy behavior in two DRX groups. In an embodiment, when the dormancy indication within the active time is enabled, the activated SCells following the dormancy indication are grouped according to a parameter, e.g. the dormancyGroupWithinActiveTime. In an embodiment, the third DCI is monitored in the secondary-primary cell when the SCells in the primary DRX group are outside the active time but the SCells in the secondary DRX group are within the active time.

In an embodiment, when the secondary-primary cell receives the third DCI (for example, DCI format 1_1) without scheduling information, the secondary-primary cell performs the corresponding operation according to the dormancy indication. When the secondary-primary cell receives the third DCI (for example, DCI format 1_1) carrying scheduling information, the secondary-primary cell ignores the dormancy indication. In an embodiment, when the secondary-primary cell receives the third DCI (for example, DCI format 1_1) carrying the scheduling information, the secondary-primary cell performs the corresponding operation according to the dormancy indication. When the secondary-primary cell receives the third DCI (for example, DCI format 1_1) without the scheduling information, the secondary-primary cell ignores the dormancy indication. In an embodiment, the secondary-primary cell receives a dormancy indication and then the activated SCells perform the operation according to the indication, regardless of whether the DCI schedules a data.

In an embodiment, when the SCell corresponds to a '1' (enabled) value of the dormancy indication in the third DCI, and the current active DL BWP is the dormant DL BWP, then an active DL BWP, provided by a respective parameter, e.g. the firstWithinActiveTimeBWP-Id, is indicated.

In an embodiment, UE does not expect the SCell in one SCell group (irrespective of whether the SCell group is outside the active time or within the active time) to have two different DRX parameter configurations. That is, one DRX group can contain multiple SCell groups, but one SCell group can only correspond to one DRX group. Alternatively, the UE does not expect the SCell in one SCell group (no matter the SCell group is outside the active time or within the active time) to belong to two frequency ranges.

In an embodiment, when the SCells in a SCell group contain two different DRX parameter configurations, the dormancy indication received by the current DRX group only works in the SCells with the same DRX configuration as the current DRX group. In an embodiment, when the SCells in a SCell group correspond to two DRX group, the dormancy indication received by the current DRX group only works in the SCells in the current DRX group.

Embodiment 4

Under certain conditions, the introduction of the secondary DRX group will cause the DRX state of the serving cells in the same cell group (MCG or SCG) to be not aligned. Therefore, when the secondary DRX group and the wake-up signal and/or the secondary DRX group and SCell dormancy indication are applied at the same time, incompatible or unclear operations may occur. To solve this problem, this embodiment uses the secondary DRX group function, the wake-up signal and the SCell dormancy indication at the same time.

In an embodiment, a UE configured with the DRX mode and the Serving Cells of the UE are configured by a control, e.g. an RRC, in two DRX groups. In an embodiment, the DRX group with the SpCell is called primary DRX group (legacy DRX group). Another DRX group is called secondary DRX group. For example, for the master cell group (MCG), the DRX group containing the PCell is the primary DRX group (legacy DRX group), and the other group is called secondary DRX group. For the secondary cell group (SCG), the DRX group containing the PSCell is the primary DRX group (legacy DRX group), and the other group is called secondary DRX group. The two DRX groups are configured by the control, e.g. the RRC, with its own set of parameters, e.g. DRX-onDurationTimer, DRX-Inactivity-Timer, and share the others DRX related parameter values.

In an embodiment, a number of search space sets are configured to monitor a respective channel, e.g. the PDCCH, for detection of the DCI in the active DL BWP. In an embodiment, the DCI is the fourth DCI, which is transmitted outside the active time and has a wake-up indication and a SCell dormancy indication. For example, the fourth DCI is the DCI format 2_6 described in Rel-16 of 5G. In an embodiment, the fourth DCI is only transmitted in the SpCell. In an embodiment, the fourth DCI is transmitted in multiple serving cells, such as SpCell and SCell. In an embodiment, when both of the wake-up indication and the dormancy indication are enabled, the UE operation can be a free combination of the above situations.

In an embodiment, when the UE is configured with the secondary DRX group, it only monitors the fourth DCI in the SpCell.

In an embodiment, the fourth DCI can be monitored in the SpCell when both DRX groups are outside the active time on PDCCH monitoring occasions prior to a next DRX cycle. In an embodiment, the DRX cycle refers to the long DRX cycle. When one DRX group is outside the active time and the other within the active time, the fourth DCI is not monitored. In an embodiment, when one DRX group is in a long DRX cycle and the other DRX group is in a short DRX cycle, the fourth DCI is not monitored. In an embodiment, when the fourth DCI is detected, the SCells of the UE are grouped according to the higher layer parameter, e.g. dormancyGroupOutsideActiveTime, regardless of whether the DRX status of the activated SCell is outside the active time or within the active time. In an embodiment, when the fourth DCI is detected, serving cells in both DRX groups start or do not start the DRX-onDurationTimer according to the value of wake-up indication bit field, and the activated BWP of activated SCells in two DRX groups indicated by the dormancy indication (bitmap). Otherwise, the UE will not monitor the fourth DCI and the serving cells in both DRX groups will start the DRX-onDurationTimer in the next DRX cycle.

In an embodiment, the UE monitors or does not monitor the fourth DCI in the SpCell according to the DRX status of the serving cells in primary DRX group. That is, the UE monitors the fourth DCI in the SpCell when the serving cells in primary DRX groups corresponding PDCCH monitoring occasions prior to a next DRX cycle are outside the active time. In an embodiment, the DRX cycle refers to the long DRX cycle. For example, at the PDCCH monitoring occasions prior to a next DRX cycle, if the serving cells in the primary DRX group are outside the active time (irrespective of whether the serving cells in the secondary DRX group are outside the active time or within the active time), the UE monitors the fourth DCI. Otherwise, the UE does not monitor the fourth DCI. In an embodiment, when the UE does not monitor the fourth DCI, the serving cells in both DRX groups will start the DRX-onDurationTimer, in the next DRX cycle.

In an embodiment, the fourth DCI is enabled for both the primary DRX group and the secondary DRX group irrespective of whether the DRX status of two DRX groups is the same or not. That is, the serving cells in both DRX groups start or do not start the DRX-onDurationTimer according to the value of wake-up indication bit field, and the activated DL BWP of activated SCells in two DRX groups indicated by the dormancy indication (bitmap).

In an embodiment, the fourth DCI is enabled for the primary DRX group but not enabled for the secondary DRX group, the activated SCells in the secondary DRX group ignore the wake-up indication and the dormancy indication irrespective of whether the DRX status of two DRX groups is the same or not. In an embodiment, the serving cells in secondary DRX groups will start a DRX-onDurationTimer in the next DRX cycle. In an embodiment, the serving cells in secondary DRX groups will not start a DRX-onDuration-Timer in the next DRX cycle. In an embodiment, the serving cells in secondary DRX groups start or do not start DRX-onDurationTimer in the next DRX cycle according to a higher layer signaling, e.g. an RRC parameter or an MAC CE. In an embodiment, when the DRX is indicated not to start a DRX-onDurationTimer, the UE is not expected to be indicated to switch BWP.

In an embodiment, both the activated SCells in the primary DRX group and the activated SCells in the secondary DRX group follow the indication of the fourth DCI when the DRX status of two DRX groups is same. In an embodiment, only the activated SCells in the primary DRX group follow the indication of the fourth DCI when the DRX status of two DRX groups is different. That is, the fourth DCI is enabled for both the primary DRX group and the secondary DRX group when the DRX status of two DRX groups is the same. For example, when the activated SCells in the primary DRX group are outside the active time and the activated SCells in the secondary DRX group are within the active time, the UE monitors the fourth DCI in SpCell, and when the fourth DCI is enabled for the primary DRX group but not enabled for the secondary DRX group, the activated SCells in the secondary DRX group ignore the indication.

(Case 4) In an embodiment, the wake-up indication is enabled for both two DRX groups, the dormancy indication is enabled for the primary DRX group, whether the dormancy indication is enabled for secondary DRX group depends on the indication information. For example, the active DL BWP of SCell in secondary DRX group are indicated to dormant BWP, the SCell ignores the dormancy indication; the active DL BWP of SCell in the secondary DRX group are indicated to non-dormant BWP, the SCell follows the dormancy indication.

(Case 5) In an embodiment, the serving cells in the primary DRX group follow the indication in the fourth DCI. Whether the serving cells in the secondary DRX group ignore or not ignore the indication in the fourth DCI is determined by the higher layer signaling (e.g. an RRC parameter or an MAC CE).

(Case 6) In an embodiment, the serving cells in the primary DRX group follows the indication in the fourth DCI. Whether the serving cells in the secondary DRX group ignore or not ignore the indication in the fourth DCI is indicated by one bit in the fourth DCI. For example, when the bit is "0", the secondary DRX group ignores the fourth DCI; when the bit is "1", the secondary DRX group follows the indication in the fourth DCI.

In an embodiment, when the wake-up indication indicates not start the DRX-onDurationTimer, the dormancy indication is ignored.

In an embodiment, the UE does not expect the SCell in one SCell group (no matter the SCell group outside active time or within active time) to have two different DRX parameter configurations. That is, one DRX group can contain multiple SCell groups, but one SCell group can only correspond to one DRX group. Alternatively, the UE does not expect the SCell in one SCell group (no matter the SCell group outside active time or within active time) to belong to two Frequency Ranges.

In an embodiment, when the SCells in a SCell group contain two different DRX parameter configurations, the dormancy indication received by the current DRX group only works in the SCells with the same DRX configuration as the current DRX group. Alternatively, when the SCells in a SCell group correspond to two DRX groups, the dormancy indication received by the current DRX group only works in the SCells in the current DRX group.

In an embodiment, when the SCell corresponds to a '1' value of dormancy indication in the fourth DCI, and current active DL BWP is the dormant DL BWP, then an active DL BWP, provided by first-non-dormant-BWP-ID-for-DCI-outside-active-time is indicated.

Embodiment 5

Under certain conditions, the introduction of the secondary DRX group may cause the DRX state of serving cells in the same cell group (MCG or SCG) to be not aligned. Therefore, when the secondary DRX group and search space set group switching indication or PDCCH skipping indication are applied at the same time, incompatible or unclear operations may occur. To solve this problem, the present disclosure provides an embodiment of using the secondary DRX group function and search space set group switching indication and/or PDCCH skipping indication at the same time.

In an embodiment, a DCI comprises at least one of the search space set group switching indication or PDCCH skipping indication.

In an embodiment, the search space set group switching indication is used to indicate a search space set group switching for one or more cell groups for a UE. For example, operations related to the search space set group switching comprises: when the UE receives a search space set group switching indication, the UE monitors the PDCCH according to the indicated search space set group after a duration of time and stop monitoring the currently applied PDCCH according to the currently applied search space set group if the currently applied search space set group is different from the indicated search space set group.

In an embodiment, the PDCCH skipping indication is used to indicate a PDCCH skipping for one or more cell groups for a UE. For example, operations related to the PDCCH skipping may comprise: when the UE receives a PDCCH skipping indication, the UE may stop monitoring the PDCCH for a first time duration. In an embodiment, the start time of the UE stopping monitoring PDCCH is several symbols or slots after the DCI which includes the PDCCH skipping indication.

In an embodiment, the UE receives the DCI including a search space set group switching indication and/or a PDCCH skipping indication in a DRX group (e.g. primary DRX group or secondary DRX group). The serving cells in the DRX group which is configured with the search space set group switching and/or the PDCCH skipping indication (i.e. the DRX group comprises the serving cell in which the DCI is received) follow the search space set group switching indication and/or the PDCCH skipping indication. As an alternative or in addition, the serving cells in another DRX group ignore the search space set group switching indication and/or the PDCCH skipping indication. In some embodiments, "configured with a search space set group switching or a PDCCH skipping" means supporting the search space set group switching or PDCCH skipping. In some embodiments, "configured with a search space set group switching or a PDCCH skipping" means being able to do a search space set group switching or PDCCH skipping. "Follow the indication means" doing a search space set group switching or PDCCH skipping according to the indication.

In an embodiment, the UE receives the DCI including a search space set group switching indication and/or a PDCCH skipping indication in a DRX group (e.g., primary DRX group or secondary DRX group). In this embodiment, the DCI is received in slot n, wherein n is an integer. In an embodiment, if a serving cell is associated with a search space set group switching and/or a PDCCH skipping based on the DCI and the serving cell is within active time at the time of UE receiving the DCI, this serving cell follows the search space set group switching indication and/or the PDCCH skipping indication. As an alternative or in addition, if a serving cell is associated with a search space set group switching and/or a PDCCH skipping based on the DCI and the serving cell is outside active time at the time of UE receiving the DCI, the serving cell ignores the search space set group switching indication and/or the PDCCH skipping indication.

In an embodiment, the UE receives the DCI including a search space set group switching indication and/or a PDCCH skipping indication in a DRX group (e.g., primary DRX group or secondary DRX group). In this embodiment, the UE receives the DCI in slot n, wherein n is an integer. If a serving cell is associated with a search space set group switching and/or a PDCCH skipping based on the DCI, the serving cell follows the search space set group switching indication and/or the PDCCH skipping indication.

In an embodiment, if a serving cell is associated with a search space set group switching based on the DCI and the serving cell is within active time at the time of UE receiving the DCI, the UE monitors the PDCCH in the serving cell according to the indicated search space set group after a first duration of time and stops monitoring the currently applied (e.g. monitored) PDCCH according to a currently applied search space set group if the currently applied search space set group is different from the indicated search space set group. In some embodiments, if a serving cell is associated with a search space set group switching based on the DCI and the serving cell is outside active time when the UE receives the DCI, the UE monitors the PDCCH in the serving cell according to the indicated search space set group after a second duration of time and stops monitoring the currently applied PDCCH according to a currently applied search space set group if the currently applied search space set group is different from the indicated search space set group. In an embodiment, the first duration is the same as the second duration. In an embodiment, the first duration is different from the second duration. In an embodiment, the first duration is smaller than the second duration.

In some embodiments, if a serving cell is associated with a PDCCH skipping based on the DCI and the serving cell is within active time at the time of the UE receiving the DCI, the UE stops monitoring the PDCCH in the serving cell for a duration after a first number of symbols or slots after receiving the DCI. As an alternative of in addition, if a serving cell is associated with a PDCCH skipping based on the DCI and the serving cell is outside active time at the time of the UE receiving the DCI, the UE stops monitoring the PDCCH in the serving cell for a duration after a second number of symbols or slots after receiving the DCI. In an embodiment, the first number is the same as the second number. In an embodiment, the first number is different from the second number. In an embodiment, the first number is smaller than the second number.

FIG. 3 shows a flowchart of a process in an embodiment of the present disclosure. The process shown in FIG. 3 may be used in a wireless terminal (e.g. UE) and comprises the following step:

Step 300: Monitor a control channel for receiving DCI in at least one serving cell in at least one of primary DRX group or secondary DRX group.

More specifically, the wireless terminal is configured (e.g. by BS) with a media access control (MAC) entity comprising a primary DRX group and a secondary DRX group. In this embodiment, the wireless terminal monitors a control channel (e.g. physical downlink control channel), for receiving the DCI in at least one serving cell in at least one of the primary DRX group or the secondary DRX group.

In the present disclosure, the at least one serving cell may represent "serving cell" (e.g. one serving cell comprising the primary cell) or "serving cells" (e.g. the set of cells comprising the Special Cell(s) and all secondary cells).

In an embodiment, the DCI is a first DCI received outside an active time of at least one of the primary DRX group or the secondary DRX group, wherein the first DCI comprises a wake-up indication (e.g. Embodiment 1). In this embodiment, the first DCI may be a WUS.

In an embodiment, on physical downlink control channel monitoring occasions prior to a next DRX cycle, the wireless terminal receives the first DCI (only) on a first cell of the primary DRX group.

In an embodiment, on physical downlink control channel monitoring occasions prior to a next DRX cycle, the wireless terminal receives the first DCI on a second cell of the secondary DRX group.

In an embodiment, on physical downlink control channel monitoring occasions prior to a next DRX cycle, the wireless terminal receives the first DCI on the first cell of the primary DRX group and on the second cell of the secondary DRX group.

In an embodiment, the first cell of the primary DRX group is the SpCell of the primary DRX group.

In an embodiment, the second cell of the secondary DRX group is a dedicated serving cell of the secondary DRX group.

In an embodiment, at least one serving cell in the primary DRX group (e.g. all of the serving cells in the primary DRX group) follows the wake-up indication in the first DCI.

In an embodiment, at least one serving cell in the secondary DRX group (e.g. all of the serving cells in the secondary DRX group) follows the wake-up indication in the first DCI.

In an embodiment, at least one serving cell in the primary DRX group and at least one serving cell in the secondary DRX group (e.g. all of the serving cells in the primary DRX group and the secondary DRX group) follow the wake-up indication in the first DCI.

In an embodiment, at least one serving cell in the primary DRX group and at least one serving cell in the secondary DRX group follows the wake-up indication of the first DCI based on at least one of a predefined information, a higher layer signaling or C bits (where C is an integer greater than 1) in the first DCI. For example, based on at least one of the predefined information, the higher layer signaling or the C bits in the first DCI, the UE determines whether the at least one serving cell in the primary DRX group and at least one serving cell in the secondary DRX group follow the wake-up indication of the first DCI or not. For example, the higher layer signaling comprises at least one of an RRC parameter or an MAC control entity.

In an embodiment, the wake-up indication comprises M bits (where M is an integer greater than 1) indicating starting or not starting a timer associated with a DRX-On duration (e.g. drx-onDurationTimer) for the primary DRX group and the secondary DRX group.

In an embodiment, the wake-up indication comprises $N=N1+N2$ bits (where $N\geq1$). In this embodiment, N1 is a number of bit(s) indicating starting or not starting a timer associated with a DRX-On duration for the primary DRX group and N2 is a number of bit(s) indicating starting or not starting a timer associated with a DRX-On duration for the secondary DRX group.

In an embodiment, the wireless terminal monitors the control channel for receiving the first DCI on physical downlink control channel monitoring occasions prior to a next DRX cycle. In an embodiment, the wireless terminal does not detect the first DCI. Under such conditions, one parameter may be predefined to indicate starting or not starting a timer associated with a DRX-On duration in the next DRX cycle for the primary DRX group and the secondary DRX group. As an alternative, two parameters are predefined to indicate starting or not starting timers associated with a DRX-On duration in the next DRX cycle separately for the primary DRX group and the secondary DRX group.

In an embodiment, the DCI is a second DCI comprising a dormancy indication. In this embodiment, the second DCI is received outside an active time of at least one of the primary DRX group or the secondary DRX group and the dormancy indication indicates a dormancy behavior of at least one serving cell in at least one of the primary DRX group or the secondary DRX group (e.g. Embodiment 2).

In an embodiment, the wireless terminal receives the second DCI (only) on a first cell of the primary DRX group.

In an embodiment, the wireless terminal receives the second DCI on a second cell of the secondary DRX group In an embodiment, the wireless terminal receives the second DCI on the first cell of the primary DRX group and receives the second DCI on the second cell of the secondary DRX group.

Note that, the first cell of the primary DRX group is the SpCell of the primary DRX group and the second cell of the secondary DRX group is a dedicated serving cell of the secondary DRX group according to an embodiment of the present disclosure.

In an embodiment, at least one serving cell in the primary DRX group follows the dormancy indication in the second DCI.

In an embodiment, at least one serving cell in the secondary DRX group follows the dormancy indication in the second DCI.

In an embodiment, at least one serving cell in the primary DRX group and at least one serving cell in the secondary DRX group follow the dormancy indication in the second DCI.

In an embodiment, at least one serving cell in the secondary DRX group follows the dormancy indication of the second DCI based on a higher layer signaling or based on N bits (where N≥1) in the second DCI. That is, the UE determines that whether the at least one serving cell in the secondary DRX group follows the dormancy indication of the second DCI based on a higher layer signaling or N bits in the second DCI. For example, the higher layer signaling comprises at least one of an RRC parameter or an MAC CE.

In an embodiment, the wireless terminal monitors the control channel for the second DCI based on a DRX status of the primary DRX group. That is, the wireless terminal monitors or does not monitor the control channel for receiving the second DCI based on the DRX status of the primary DRX group.

In an embodiment, the wireless terminal monitors the control channel for the second DCI based on a DRX status of the secondary DRX group. That is, the wireless terminal monitors or does not monitor the control channel for receiving the second DCI based on the DRX status of the secondary DRX group.

In an embodiment, the wireless terminal monitors the control channel for the second DCI based on both the DRX statuses of the primary DRX group and secondary DRX group.

In an embodiment, the DCI is a third DCI comprising a dormancy indication. In this embodiment, the third DCI is received within an active time of at least one of the primary DRX group or the secondary DRX group, and the dormancy indication indicates a dormancy behavior of at least one serving cell in at least one of the primary DRX group or the secondary DRX group (e.g. Embodiment 3).

In an embodiment, the wireless terminal receives the third DCI (only) on a first cell of the primary DRX group.

In an embodiment, the wireless terminal receives the third DCI on a second cell of the secondary DRX group.

In an embodiment, the wireless terminal receives the third DCI on both the first cell of the primary DRX group and the second cell of the secondary DRX group.

Note that, the first cell of the primary DRX group is the SpCell of the primary DRX group and the second cell of the secondary DRX group is a dedicated serving cell of the secondary DRX group according to an embodiment of the present disclosure.

In an embodiment, the wireless terminal monitors the control channel for receiving the third DCI within the active time of the primary DRX group. In this embodiment, the primary DRX group is within the active time or both the primary DRX group and the secondary DRX group are within the active time.

In an embodiment, at least one serving cell in the primary DRX group and at least one serving cell in the secondary DRX group follow the dormancy indication of the third DCI.

In an embodiment, at least one serving cell in one of the primary DRX group and the secondary DRX group follow the dormancy indication of the third DCI.

In an embodiment, the third DCI comprises N bits (where N≥1) indicating whether the dormancy indication is enabled for at least one serving cell in the primary DRX group (e.g. all of the secondary cells in the primary DRX group) and at least one serving cell in the secondary DRX group (e.g. all of the secondary cells in the secondary DRX group).

In an embodiment, the dormancy indication received in one of the primary DRX group and the secondary DRX group indicates the dormancy behavior of at least one serving cell in the DRX group in which the dormancy indication is received.

In an embodiment, the dormancy indication received in one of the primary DRX group and the secondary DRX group indicates the dormancy behavior of at least one serving cell in the primary DRX group and at least one serving cell in the secondary DRX group.

In an embodiment, the third DCI is received on the second cell (e.g. dedicated serving cell) of the secondary DRX group. In this embodiment, at least one secondary cell follows the dormancy indication when the third DCI comprises scheduling information. As an alternative, the at least one secondary cell follows the dormancy indication when the third DCI does not comprise the scheduling information. As an alternative, the at least one secondary cell follows the dormancy indication regardless of whether the third DCI comprises the scheduling information.

In an embodiment, the DCI is a fourth DCI received outside an active time of at least one of the primary DRX group or the secondary DRX group. In this embodiment, the fourth DCI comprises a wake-up indication and a dormancy indication (e.g. Embodiment 4).

In an embodiment, on physical downlink control channel monitoring occasions prior to a next DRX cycle, the wireless terminal receives the fourth DCI (only) on a first cell of the primary DRX group.

In an embodiment, on physical downlink control channel monitoring occasions prior to a next DRX cycle, the wireless terminal receives the fourth DCI on a second cell of the secondary DRX group.

In an embodiment, on physical downlink control channel monitoring occasions prior to a next DRX cycle, the wireless terminal receives the fourth DCI on the first cell of the primary DRX group and receives the fourth DCI on the second cell of the secondary DRX group.

Note that, the first cell of the primary DRX group is the SpCell of the primary DRX group and the second cell of the secondary DRX group is a dedicated serving cell of the secondary DRX group according to an embodiment of the present disclosure.

In an embodiment, the fourth DCI indicates the wireless terminal to start or not to start a timer associated with a DRX-On duration and dormancy behavior related operations in one of the primary DRX group and the secondary DRX group. As an alternative or in addition, the fourth DCI indicates the wireless terminal to start or not to start a timer associated with a DRX-On duration and dormancy behavior related operations in the primary DRX group and the secondary DRX group.

In an embodiment, the wireless terminal monitors the control channel for receiving the fourth DCI on a first cell of the primary DRX group based on a DRX status of the primary DRX group.

In an embodiment, the wireless terminal monitors the control channel for receiving the fourth DCI prior to a next long DRX cycle outside of an active time one of the primary DRX group and the secondary DRX group.

In an embodiment, the wireless terminal does not monitor the control channel for receiving the fourth DCI prior to a next long DRX cycle outside of an active time of the primary DRX group.

In an embodiment, the wireless terminal starts a timer associated with a DRX-On duration in the next DRX cycle when not monitoring the control channel for receiving the fourth DCI prior to the next long DRX cycle.

In an embodiment, at least one (activated) secondary cell in the primary DRX group and at least one secondary cell in the secondary DRX group follow at least one of the wake-up indication or the dormancy indication in the fourth DCI.

In an embodiment, at least one (activated) secondary cell in the primary DRX group follows at least one of the wake-up indication or the dormancy indication of the fourth DCI.

In an embodiment, at least one (activated) secondary cell in the secondary DRX group follows at least one of the wake-up indication or the dormancy indication of the fourth DCI.

In an embodiment, the dormancy indication of the fourth DCI is applied to at least one serving cell of the secondary DRX group based on at least one of predefined information, a higher layer signaling, or N bits (where ≥1) in the fourth DCI.

In an embodiment, the higher layer signaling comprises at least one of an RRC parameter or an MAC CE In an embodiment, the wireless terminal receives the DCI in one of the primary DRX group and the secondary DRX group. In this embodiment, the DCI includes at least one of a first indication indicating a search space set group switching or a second indication indicating a PDCCH skipping.

In an embodiment, at least one serving cell in the one of the primary DRX group and the secondary DRX group in which the DCI is received follows at least one of the first indication or the second indication. As an alternative or in addition, at least one serving cell in another one of the primary DRX group (in which the DCI is not received) ignores at least one of the first indication the second indication.

In an embodiment, when the DCI is received within an active time of at least one of the primary DRX group or the secondary DRX group and the method comprises following at least one of the first indication or the second indication. As an alternative or in addition, the DCI is received outside of an active time of at least one of the primary DRX group or the secondary DRX group and the method further comprises ignoring at least one of the first indication or the second indication.

Figure 4:
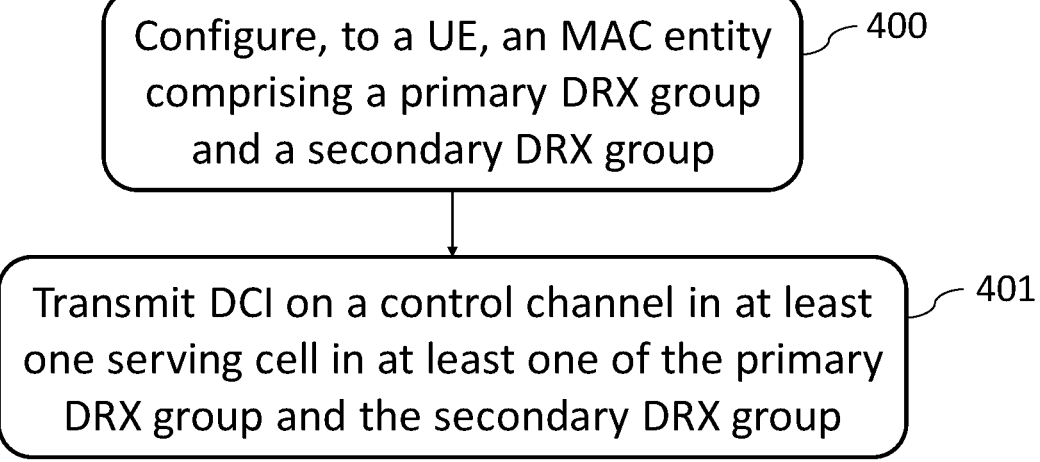
FIG. 4 shows a flowchart of a process according to an embodiment of the present disclosure.

FIG. 4 shows a flowchart of a process in an embodiment of the present disclosure. The process shown in FIG. 4 may be used in a wireless network node (e.g. BS) and comprises the following step:

Step 400: Configure, to a UE, an MAC entity comprising a primary DRX group and a secondary DRX group.

Step 401: Transmit DCI on a control channel in at least one serving cell in at least one of the primary DRX group and the secondary DRX group.

In the process shown in FIG. 4, the BS configures an MAC entity comprising a primary DRX group and a secondary DRX group to the UE and transmits the DCI on a control channel in at least one serving cell in at least one of the primary DRX group and the secondary DRX group.

In an embodiment, the DCI is a first DCI transmitted outside an active time of at least one of the primary DRX group or the secondary DRX group, wherein the first DCI comprises a wake-up indication.

In an embodiment, on physical downlink control channel monitoring occasions prior to a next DRX cycle, the BS transmits the first DCI on a first cell of the primary DRX group.

In an embodiment, on physical downlink control channel monitoring occasions prior to a next DRX cycle, the BS transmits the first DCI on a second cell of the secondary DRX group In an embodiment, on physical downlink control channel monitoring occasions prior to a next DRX cycle, the BS transmits the first DCI on the first cell of the primary DRX group and transmitting the first DCI on the second cell of the secondary DRX group.

Note that, the first cell may be the SpCell in the primary DRX group and the second cell may be a dedicated serving cell of the secondary DRX group.

In an embodiment, the first DCI comprises at least one of a predefined information, a higher layer signaling or C bits (where C≥1), for indicating whether at least one serving cell in the primary DRX group (e.g. all of the serving cells in the primary DRX group) or at least one serving cell in the secondary DRX group (e.g. all of the serving cells in the secondary DRX group) follows the wake-up indication of the first DCI. For example, the higher layer signaling comprises at least one of a radio resource control parameter or an MAC CE.

In an embodiment, the wake-up indication comprises M bits (where M≥1) indicating starting or not starting a timer associated with a DRX-On duration for the primary DRX group and the secondary DRX group.

In an embodiment, the wake-up indication comprises N=N1+N2 bits (where N≥1). In this embodiment, N1 is a number of bit(s) indicating starting or not starting a timer associated with a DRX-On duration for the primary DRX group and N2 is a number of bit(s) indicating starting or not starting a timer associated with a DRX-On duration for the secondary DRX group.

In an embodiment, the DCI is a second DCI comprising a dormancy indication. In this embodiment, the second DCI is transmitted outside an active time of at least one of the primary DRX group or the secondary DRX group and the dormancy indication indicates a dormancy behavior of at least one serving cell in at least one of the primary DRX group or the secondary DRX group.

In an embodiment, the BS transmits the second DCI on a first cell of the primary DRX group.

In an embodiment, the BS transmits the second DCI on a second cell of the secondary DRX group In an embodiment, the BS transmits the second DCI on the first cell of the primary DRX group and transmits the second DCI on the second cell of the secondary DRX group.

Note that, the first cell may be the SpCell in the primary DRX group and the second cell may be a dedicated serving cell of the secondary DRX group.

In an embodiment, the DCI is a third DCI comprising a dormancy indication. In this embodiment, the third DCI is transmitted within an active time of at least one of the primary DRX group or the secondary DRX group and the dormancy indication indicates a dormancy behavior of at least one serving cell in at least one of the primary DRX group or the secondary DRX group.

In an embodiment, the BS transmits the third DCI on a first cell of the primary DRX group.

In an embodiment, the BS transmits the third DCI on a second cell of the secondary DRX group In an embodiment, the BS transmits the third DCI on the first cell of the primary DRX group and transmits the third DCI on the second cell of the secondary DRX group.

Note that, the first cell may be the SpCell in the primary DRX group and the second cell may be a dedicated serving cell of the secondary DRX group.

In an embodiment, the third DCI comprises N bits (where $N \geq 1$) indicating whether the dormancy indication is enabled for at least one secondary cell in the primary DRX group and at least one secondary cell in the secondary DRX group.

In an embodiment, the dormancy indication transmitted in one of the primary DRX group and the secondary DRX group indicates the dormancy behavior of at least one serving cell in the DRX group in which the dormancy indication is received.

In an embodiment, the dormancy indication transmitted in one of the primary DRX group and the secondary DRX group indicates the dormancy behavior of at least one serving cell in the primary DRX group and at least one serving cell in the secondary DRX group.

In an embodiment, the DCI is a fourth DCI transmitted outside an active time of at least one of the primary DRX group or the secondary DRX group. In this embodiment, the fourth DCI comprises a wake-up indication and a dormancy indication.

In an embodiment, the BS transmits the fourth DCI on a first cell of the primary DRX group.

In an embodiment, the BS transmits the fourth DCI on a second cell of the secondary DRX group In an embodiment, the BS transmits the fourth DCI on the first cell of the primary DRX group and transmits the fourth DCI on the second cell of the secondary DRX group.

Note that, the first cell may be the SpCell in the primary DRX group and the second cell may be a dedicated serving cell of the secondary DRX group.

In an embodiment, the fourth DCI indicates starting or not starting a timer associated with a DRX-On duration and dormancy behavior related operations in one of the primary DRX group and the secondary DRX group.

In an embodiment, the fourth DCI indicates the UE to start or not a timer associated with a DRX-On duration and dormancy behavior related operations in the primary DRX group and the secondary DRX group.

In an embodiment, the dormancy indication is applied to at least one serving cell of the secondary DRX group based on at least one of predefined information, a higher layer signaling, or N bits (where $N \geq 1$) in the fourth DCI. For example, the higher layer signaling comprises at least one of an RRC parameter or an MAC CE.

In an embodiment, at least one of a first indication indicating a search space set group switching or a second indication indicating a PDCCH skipping.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for use in a user equipment (UE) wherein a Medium Access Control (MAC) entity of the UE, comprises a primary discontinuous reception (DRX) group and a secondary DRX group, the method comprising:

monitoring a control channel for receiving a downlink control information (DCI), wherein the DCI is a first DCI received outside an active time of at least one of the primary DRX group or the secondary DRX group, wherein the first DCI comprises a wake-up indication on physical downlink control channel monitoring occasions prior to a next DRX cycle, and receiving the first DCI on a first cell of the primary DRX group, wherein the first DCI indicates whether at least one serving cell in the primary DRX group and at least one serving cell in the secondary DRX group follow the wake-up indication of the first DCI based on C bits, where $C \geq 1$, in the first DCI, wherein the wake-up indication comprises $N=N1+N2$ bits, where $N \geq 1$, N1 is a number of bit(s) indicating starting or not starting a timer associated with a DRX-On duration for the primary DRX group, and N2 is a number of bit(s) indicating starting or not starting a timer associated with a DRX-On duration for the secondary DRX group, and wherein an indication by the wake-up indication to not start a timer associated with a DRX-On duration further indicates that the user equipment is not expected to be indicated to switch a bandwidth part.

2. The method of claim 1, wherein the DCI is a second DCI comprising a dormancy indication, wherein the second DCI is received outside an active time of at least one of the primary DRX group or the secondary DRX group, and wherein the dormancy indication indicates a dormancy behavior of at least one serving cell in at least one of the primary DRX group or the secondary DRX group, further comprising:

receiving the second DCI on a first cell of the primary DRX group, wherein:

at least one serving cell in the primary DRX group and at least one serving cell in the secondary DRX group follow the dormancy indication; and wherein at least one serving cell in the secondary DRX group follows the dormancy indication of the second DCI based on N bits, where $N \geq 1$, in the second DCI.

3. The method of claim 2, wherein the monitoring the control channel for receiving the second DCI in the primary DRX group comprises:

monitoring the control channel for the second DCI based on a DRX status of the primary DRX group;

monitoring the control channel for the second DCI based on a DRX status of the secondary DRX group; or monitoring the control channel for the second DCI based on the DRX statuses of the primary DRX group and secondary DRX group.

4. The method of claim 1, wherein the DCI is a third DCI comprising a dormancy indication, wherein the third DCI is received within an active time of at least one of the primary DRX group or the secondary DRX group, and wherein the dormancy indication indicates a dormancy behavior of at least one serving cell in at least one of the primary DRX group or the secondary DRX group, further comprising:

receiving the third DCI on a first cell of the primary DRX.

5. The method of claim 4, wherein the third DCI comprises N bits, where N≥1, indicating whether the dormancy indication is enabled for at least one serving cell in the primary DRX group and at least one serving cell in the secondary DRX group, wherein:

the dormancy indication received in one of the primary DRX group and the secondary DRX group indicates the dormancy behavior of at least one serving cell in the DRX group in which the dormancy indication is received; or the dormancy indication received in one of the primary DRX group and the secondary DRX group indicates the dormancy behavior of at least one serving cell in the primary DRX group and at least one serving cell in the secondary DRX group.

6. The method of claim 1, wherein the DCI is a fourth DCI received outside an active time of at least one of the primary DRX group or the secondary DRX group, wherein the fourth DCI comprises a wake-up indication and a dormancy indication, comprising, on physical downlink control channel monitoring occasions prior to a next DRX cycle:

receiving the fourth DCI on a first cell of the primary DRX group; and wherein:

the fourth DCI indicates starting or not starting a timer associated with a DRX-On duration and dormancy behavior related operations in one of the primary DRX group and the secondary DRX group; and wherein the fourth DCI indicates the UE to start or not a timer associated with a DRX-On duration and dormancy behavior related operations in the primary DRX group and the secondary DRX group.

7. The method of claim 6, wherein the monitoring the control channel for receiving the fourth DCI in the at least one serving cell in the primary DRX group comprises:

monitoring the control channel for receiving the fourth DCI on a first cell of the primary DRX group based on a DRX status of the primary DRX group, and further comprising:

not monitoring the control channel for receiving the fourth DCI prior to the next long DRX cycle within the active time of one of the primary DRX group and secondary DRX group, and starting a timer associated with a DRX-On duration in the next DRX cycle when not monitoring the control channel for receiving the fourth DCI prior to the next long DRX cycle, wherein:

at least one secondary cell in the primary DRX group and at least one secondary cell in the secondary DRX group follow at least one of the wake-up indication or the dormancy indication; and wherein the dormancy indication is applied to at least one serving cell of the secondary DRX group based on at least one of predefined information, a higher layer signaling, or N bits, where N≥1, in the fourth DCI, wherein the higher layer signaling comprises at least one of a radio resource control parameter or an MAC control entity.

8. The method of claim 1, further comprising: receiving the DCI in one of the primary DRX group and the secondary DRX group, wherein the DCI includes at least one of a first indication indicating a search space set group switching or a second indication indicating a physical downlink control channel (PDCCH) skipping, wherein at least one serving cell in the one of the primary DRX group and the secondary DRX group in which the DCI is received follows at least one of the first indication or the second indication; and wherein when the DCI is received within an active time of at least one of the primary DRX group or the secondary DRX group and the method comprises following at least one of the first indication or the second indication.

9. A method for use in a base station, the method comprising:

configuring, to a user equipment (UE), a medium access control (MAC) entity comprising a primary discontinuous reception (DRX) group and a secondary DRX group, and transmitting a first downlink control information (DCI) on a control channel, on a first cell of the primary DRX group, wherein the DCI is a first DCI transmitted outside an active time of at least one of the primary DRX group or the secondary DRX group, wherein the first DCI comprises a wake-up indication on physical downlink control channel monitoring occasions prior to a next DRX cycle, wherein the first DCI indicates whether at least one serving cell in the primary DRX group and at least one serving cell in the secondary DRX group follow the wake-up indication of the first DCI based on C bits, where C≥1, in the first DCI, wherein the wake-up indication comprises N=N1+N2 bits, where N≥1, N1 is a number of bit(s) indicating starting or not starting a timer associated with a DRX-On duration for the primary DRX group, and N2 is a number of bit(s) indicating starting or not starting a timer associated with a DRX-On duration for the secondary DRX group, and wherein an indication by the wake-up indication to not start a timer associated with a DRX-On duration further indicates that the user equipment is not expected to be indicated to switch a bandwidth part.

10. The method of claim 9, wherein the DCI is a second DCI comprising a dormancy indication, wherein the second DCI is transmitted outside an active time of at least one of the primary DRX group or the secondary DRX group, and wherein the dormancy indication indicates a dormancy behavior of at least one serving cell in at least one of the primary DRX group or the secondary DRX group; and wherein the transmitting the DCI on the control channel in at least one serving cell in at least one of the primary DRX group and the secondary DRX group comprises:

transmitting the second DCI on a first cell of the primary DRX group.

11. The method of claim 9, wherein the DCI is a third DCI comprising a dormancy indication, wherein the third DCI is transmitted within an active time of at least one of the primary DRX group or the secondary DRX group, and wherein the dormancy indication indicates a dormancy behavior of at least one serving cell in at least one of the primary DRX group or the secondary DRX group;

wherein the transmitting the DCI on the control channel in at least one serving cell in at least one of the primary DRX group and the secondary DRX group comprises:

transmitting the third DCI on a first cell of the primary DRX group.

12. The method of claim 9, wherein the DCI is a fourth DCI transmitted outside an active time of at least one of the primary DRX group or the secondary DRX group, wherein the fourth DCI comprises a wake-up indication and a dormancy indication;

wherein the transmitting the DCI on the control channel in at least one serving cell in at least one of the primary DRX group and the secondary DRX group comprises, on physical downlink control channel monitoring occasions prior to a next DRX cycle: transmitting the fourth DCI on a first cell of the primary DRX group, or transmitting the fourth DCI on a second cell of the secondary DRX group, or transmitting the fourth DCI on the first cell of the primary DRX group and transmitting the fourth DCI on the second cell of the secondary DRX group, and wherein:

the fourth DCI indicates starting or not starting a timer associated with a DRX-On duration and dormancy behavior related operations in one of the primary DRX group and the secondary DRX group; and wherein the dormancy indication is applied to at least one serving cell of the secondary DRX group based on at least one of predefined information, a higher layer signaling, or N bits, where $N \geq 1$, in the fourth DCI, wherein the higher layer signaling comprises at least one of a radio resource control parameter or an MAC control entity.

13. The method of claim 9, wherein the DCI includes at least one of a first indication indicating a search space set group switching or a second indication indicating a physical downlink control channel (PDCCH) skipping.

14. A user equipment (UE), wherein a Medium Access Control (MAC) entity of the UE, comprises a primary discontinuous reception (DRX) group and a secondary DRX group, the user equipment comprising a processor configured to:

monitor a control channel for receiving a downlink control information (DCI), wherein the DCI is a first DCI received outside an active time of at least one of the primary DRX group or the secondary DRX group, wherein the first DCI comprises a wake-up indication on physical downlink control channel monitoring occasions prior to a next DRX cycle, and receive the first DCI on a first cell of the primary DRX group, wherein the first DCI indicates whether at least one serving cell in the primary DRX group and at least one serving cell in the secondary DRX group follow the wake-up indication of the first DCI based on C bits, where $C \geq 1$, in the first DCI, wherein the wake-up indication comprises $N = N1 + N2$ bits, where $N \geq 1$, N1 is a number of bit(s) indicating starting or not starting a timer associated with a DRX-On duration for the primary DRX group, and N2 is a number of bit(s) indicating starting or not starting a timer associated with a DRX-On duration for the secondary DRX group, and wherein an indication by the wake-up indication to not start a timer associated with a DRX-On duration further indicates that the user equipment is not expected to be indicated to switch a bandwidth part.

15. A base station, comprising:

a processor configured to configure, to a user equipment (UE), a medium access control (MAC) entity comprising a primary discontinuous reception (DRX) group and a secondary DRX group; and a communication unit, configured to transmit a first downlink control information (DCI), on a control channel, on a first cell of the primary DRX group, wherein the DCI is a first DCI transmitted outside an active time of at least one of the primary DRX group or the secondary DRX group, wherein the first DCI comprises a wake-up indication on physical downlink control channel monitoring occasions prior to a next DRX cycle, wherein the first DCI indicates whether at least one serving cell in the primary DRX group and at least one serving cell in the secondary DRX group follow the wake-up indication of the first DCI based on C bits, where $C \geq 1$, in the first DCI, wherein the wake-up indication comprises $N = N1 + N2$ bits, where $N \geq 1$, N1 is a number of bit(s) indicating starting or not starting a timer associated with a DRX-On duration for the primary DRX group, and N2 is a number of bit(s) indicating starting or not starting a timer associated with a DRX-On duration for the secondary DRX group, and wherein an indication by the wake-up indication to not start a timer associated with a DRX-On duration further indicates that the user equipment is not expected to be indicated to switch a bandwidth part.

\* \* \* \* \*